United States Patent
Takezawa

(10) Patent No.: US 10,365,599 B2
(45) Date of Patent: Jul. 30, 2019

(54) IMAGE FORMING APPARATUS WITH WRITE START TIMING DETERMINATION

(71) Applicant: CANON KABUSHIKI KAISHA, Tokyo (JP)

(72) Inventor: Satoru Takezawa, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/584,478

(22) Filed: May 2, 2017

(65) Prior Publication Data

US 2017/0329265 A1 Nov. 16, 2017

(30) Foreign Application Priority Data

May 13, 2016 (JP) .................................. 2016-096778
May 23, 2016 (JP) .................................. 2016-102264

(51) Int. Cl.

| G03G 15/00 | (2006.01) |
|---|---|
| G03G 15/043 | (2006.01) |
| G03G 15/22 | (2006.01) |
| H04N 1/00 | (2006.01) |
| G03G 15/23 | (2006.01) |
| G03G 15/16 | (2006.01) |

(52) U.S. Cl.
CPC ......... *G03G 15/228* (2013.01); *G03G 15/043* (2013.01); *G03G 15/234* (2013.01); *G03G 15/5058* (2013.01); *H04N 1/00005* (2013.01); *G03G 15/16* (2013.01); *G03G 2215/00037* (2013.01); *G03G 2215/00042* (2013.01); *G06K 2215/0011* (2013.01)

(58) Field of Classification Search
None
See application file for complete search history.

(56) References Cited

U.S. PATENT DOCUMENTS

| 6,603,495 B2 * | 8/2003 | Hayakawa | ............. H04N 1/506 |
|---|---|---|---|
| | | | 347/116 |
| 2008/0226360 A1 * | 9/2008 | Sugiyama | .......... G03G 15/0131 |
| | | | 399/301 |
| 2009/0091773 A1 * | 4/2009 | Kushida | ............... G03G 15/167 |
| | | | 358/1.12 |
| 2014/0363211 A1 * | 12/2014 | Sugiyama | .......... G03G 15/5058 |
| | | | 399/301 |

FOREIGN PATENT DOCUMENTS

JP      2003-005490 A     1/2003

* cited by examiner

*Primary Examiner* — Victor Verbitsky
(74) *Attorney, Agent, or Firm* — Venable LLP

(57) ABSTRACT

An image forming apparatus operable at a plurality of image forming speeds includes a pattern detection unit configured to detect a registration correction pattern at a first image forming speed, a writing start timing determination unit configured to determine writing start timing at which an electrostatic latent image is started to be written on a photosensitive member by a light beam emitted from a light source, and a storage unit configured to store in advance a correction amount for correcting the writing start timing. When the image forming apparatus operates at the first image forming speed set in advance, an image is formed at the writing start timing determined by the writing start timing determination unit. When the image forming apparatus operates at a second image forming speed, an image is formed at a writing start timing corrected based on the correction amount and a speed ratio.

11 Claims, 21 Drawing Sheets

FIG. 2A
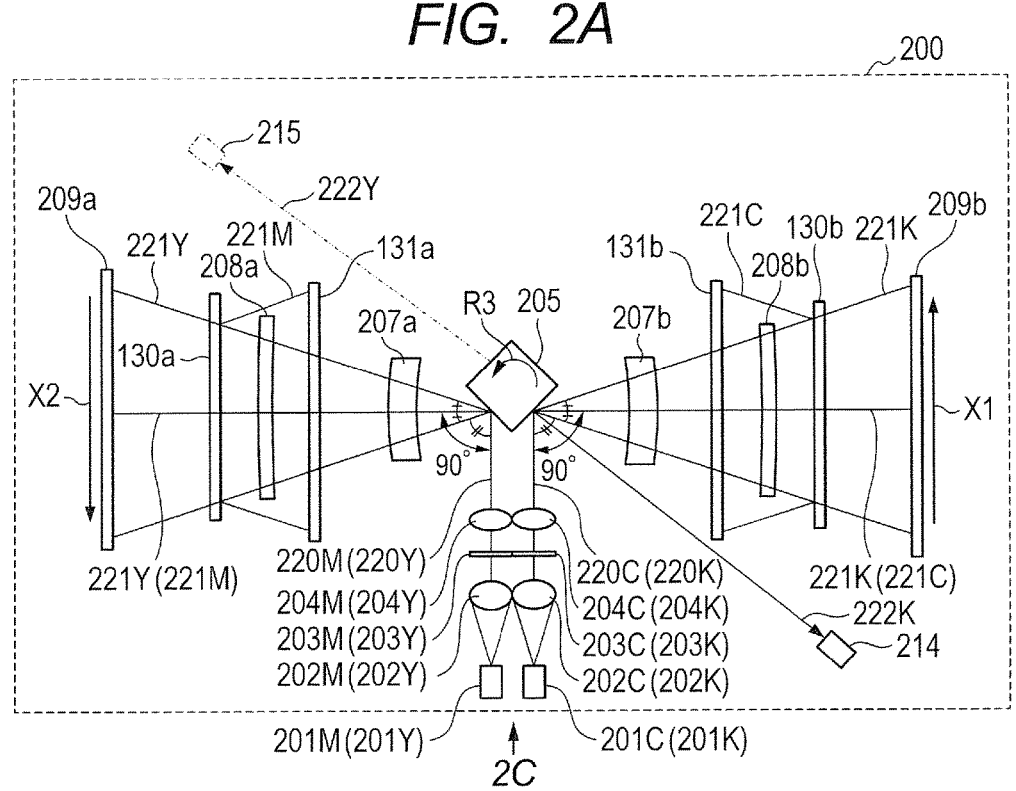
FIG. 2B
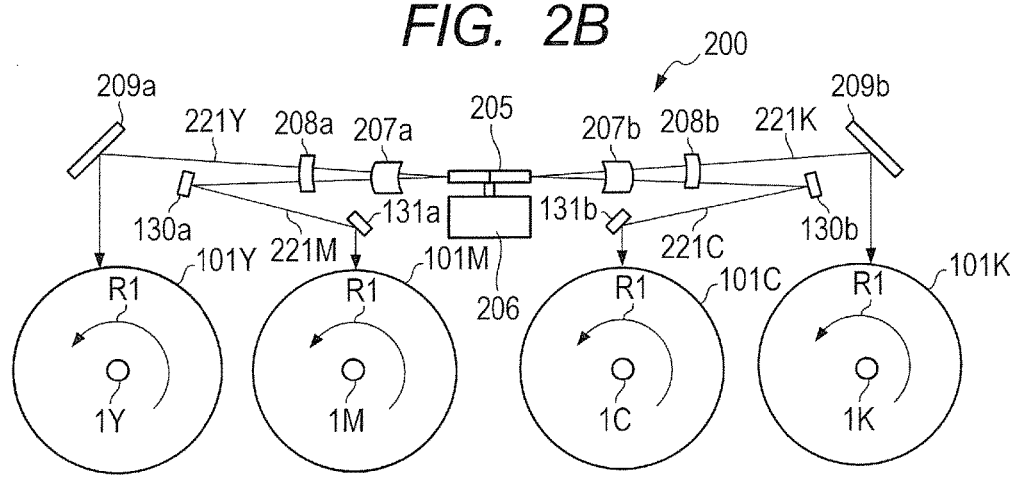
FIG. 2C

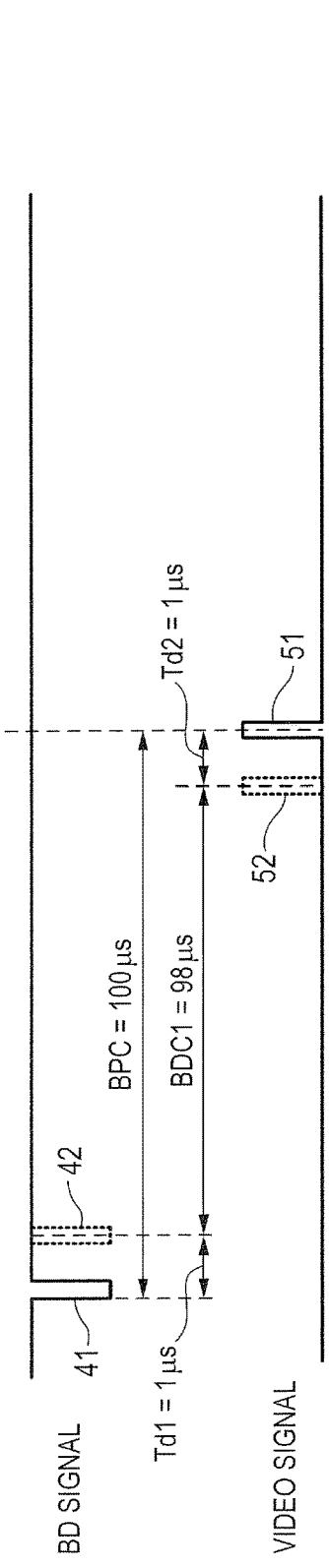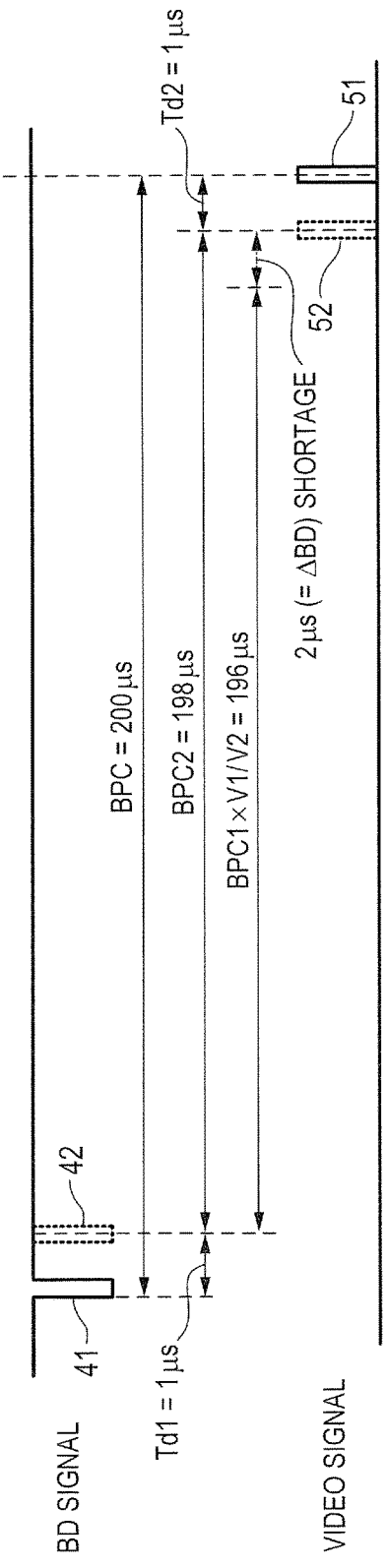

IMAGE FORMING APPARATUS WITH WRITE START TIMING DETERMINATION

BACKGROUND OF THE INVENTION

Field of the Invention

The present invention relates to an image forming apparatus which is operable at a plurality of image forming speeds.

Description of the Related Art

An electrophotographic image forming apparatus, for example, a copying machine or a laser beam printer, forms an electrostatic latent image by scanning a light beam that is emitted from a light source over a photosensitive member, and obtains toner images in a plurality of colors by developing the electrostatic latent image with the use of toners of a plurality of colors. The toner images of a plurality of colors are transferred onto a bearing member belt to be overlapped with one another. The toner images of a plurality of colors on the bearing member belt are transferred onto a recording medium, and the toner images are then fixed to form a color image. In order to avoid color misregistration between a toner image of one color and a toner image of another color, a registration correction pattern is formed on the bearing member belt, and a color misregistration amount is detected by detecting the registration correction pattern. A position where the electrostatic latent image is formed is adjusted based on the detected color misregistration amount, to thereby correct color misregistration and correct the image position (Japanese Patent Application Laid-Open No. 2003-5490). Color misregistration occurs usually from the expansion/shrinking of parts. The image forming apparatus therefore regularly executes a registration correction mode in which a registration correction pattern is formed and color misregistration is detected by detecting where the registration correction pattern is formed.

In an image forming mode for forming an image based on input image data, the image forming apparatus adjusts writing start timing at which the electrostatic latent image is begun to be written with the light beam in each scanning cycle of the light beam, based on the result of detecting the registration correction pattern. The writing start timing is light beam emission start timing based on the image data. Specifically, the image forming apparatus adjusts the length of time from when a beam detector (hereinafter abbreviated as "BD") receiving a light beam outputs a synchronization signal (hereinafter referred to as "BD signal") to when a light source outputs a light beam for writing an electrostatic latent image on the photosensitive member based on image data. Through execution of the adjustment, the writing of the electrostatic latent image can be started at a substantially constant position in a main scanning direction in which a light beam scans on the photosensitive member. The writing start timing is controlled by a CPU or other components by resolution in units of the frequency of a clock signal.

Some image forming apparatus can operate in a mode in which an image is formed at an image forming speed that is slower than normal in order to improve image quality or in order to ensure that an image is fixed well on a type of paper that requires many calories to melt toner (thick paper or the like). In order to form a satisfactory image on various types of paper that are used by a user, it is common nowadays to provide more options for the speed of forming an image, and the range of image forming speeds used in one same image forming apparatus is widening. Cases of printing on various types of paper in one job, for example, the case of printing a booklet that uses different types of paper for its cover sheet and bookblock sheet, are also increasing in number. In order to change the image forming speed, the rotation speed of the photosensitive member is required to be changed. A change in the rotation speed of the photosensitive member requires, in turn, a change in light beam scanning speed in some cases.

However, when the image forming apparatus executes the registration correction mode each time the image forming speed is changed, downtime increases, and the productivity drops. The image forming apparatus avoids this by forming an image based on a registration correction amount that is used prior to the change of the image forming speed even after the change. The reason is that the color misregistration amount measured in distance does not change even in the case where the image forming speed is changed immediately after registration correction. The length of time of the registration correction mode is reduced in this manner. For example, after writing start timing is obtained by executing the registration correction mode at a normal image forming speed, the registration correction mode is not executed at an image forming speed that is slower than normal. Writing start timing that is used to form an image at a slower-than-normal image forming speed is calculated by multiplying writing start timing that is obtained in the registration correction mode at the normal image forming speed by the ratio of the normal image forming speed and the slower-than-normal image forming speed. The length of time in which image forming is stopped is shortened in this manner.

However, strictly speaking, writing start timing that is obtained in the registration correction mode includes a delay time till the BD signal output from the BD is input to the CPU and delay times of circuits in the CPU. The writing start timing further includes a delay time from when the CPU outputs an image signal (hereinafter referred to as "video signal") to a light source drive portion till when the light source emits a light beam. The delay times are constant irrespective of the image forming speed.

Accordingly, there is an error in writing start timing for a slower-than-normal image forming speed that is determined by obtaining wiring start timing for a normal image forming speed through the execution of the registration correction mode and multiplying the obtained wiring start timing by the ratio of the normal image forming speed and the slower-than-normal image forming speed. The effect of the delay times in signal transmission is prominent particularly when one scanning cycle of the light beam in the main scanning direction is set to several hundreds of microseconds for high-speed scanning.

In order to avoid image misregistration due to the delay times in signal transmission, the registration correction mode may be executed each time the image forming speed is changed. However, when the registration correction mode is executed prior to image forming each time the image forming speed is changed, an image forming suspension time is generated, and accordingly the productivity of images formed by the image forming apparatus is lowered.

SUMMARY OF THE INVENTION

It is therefore an object of the present invention to provide an image forming apparatus configured to prevent image misregistration when the image forming speed is switched, while shortening the length of time in which image forming is stopped.

In order to solve the above-mentioned problem, according to an embodiment, there is provided an image forming apparatus, which is operable at a plurality of image forming speeds, comprising:

a photosensitive member;

a light source configured to emit a light beam;

a deflection unit configured to deflect the light beam emitted from the light source so that the light beam scans on a surface of the photosensitive member in a main scanning direction;

a transfer unit configured to develop, with a toner, an electrostatic latent image, which is formed on the surface of the photosensitive member by the light beam, and to transfer a developed toner image onto a bearing member or a recording medium that is conveyed by the bearing member;

a pattern detection unit configured to detect a registration correction pattern, which is transferred onto the bearing member by the transfer unit when the image forming apparatus operates at a first image forming speed set in advance;

a writing start timing determination unit configured to determine writing start timing at which the electrostatic latent image is started to be written on the photosensitive member by the light beam emitted from the light source when the image forming apparatus operates at the first image forming speed, based on a detection result of the pattern detection unit; and a storage unit configured to store, in advance, a correction amount for correcting the writing start timing when the image forming apparatus operates at a second image forming speed, which differs from the first image forming speed, wherein, when the image forming apparatus operates at the first image forming speed, an image is formed at the writing start timing determined by the writing start timing determination unit, and wherein, when the image forming apparatus operates at the second image forming speed, the writing start timing determined by the writing start timing determination unit is corrected based on the correction amount that is stored in the storage unit and on a speed ratio of the first image forming speed to the second image forming speed, and an image is formed at the corrected writing start timing.

Further features of the present invention will become apparent from the following description of exemplary embodiments with reference to the attached drawings.

BRIEF DESCRIPTION OF THE DRAWINGS

FIG. 2A is a plan view of a light scanning device.

FIG. 2B is a side view for illustrating light paths of light beams from a rotary polygon mirror to photosensitive drums.

FIG. 2C is a diagram for illustrating the arrangement of laser emitting elements that is viewed from an arrow 2C of FIG. 2A.

FIG. 7A and FIG. 7B are timing charts for illustrating a relation between the correction of center image writing start timing that is based on a speed ratio, and a correction amount.

DESCRIPTION OF THE EMBODIMENTS

The embodiments will be described below with reference to the accompanying drawings.

First Embodiment (Image Forming Apparatus)

Figure 1:
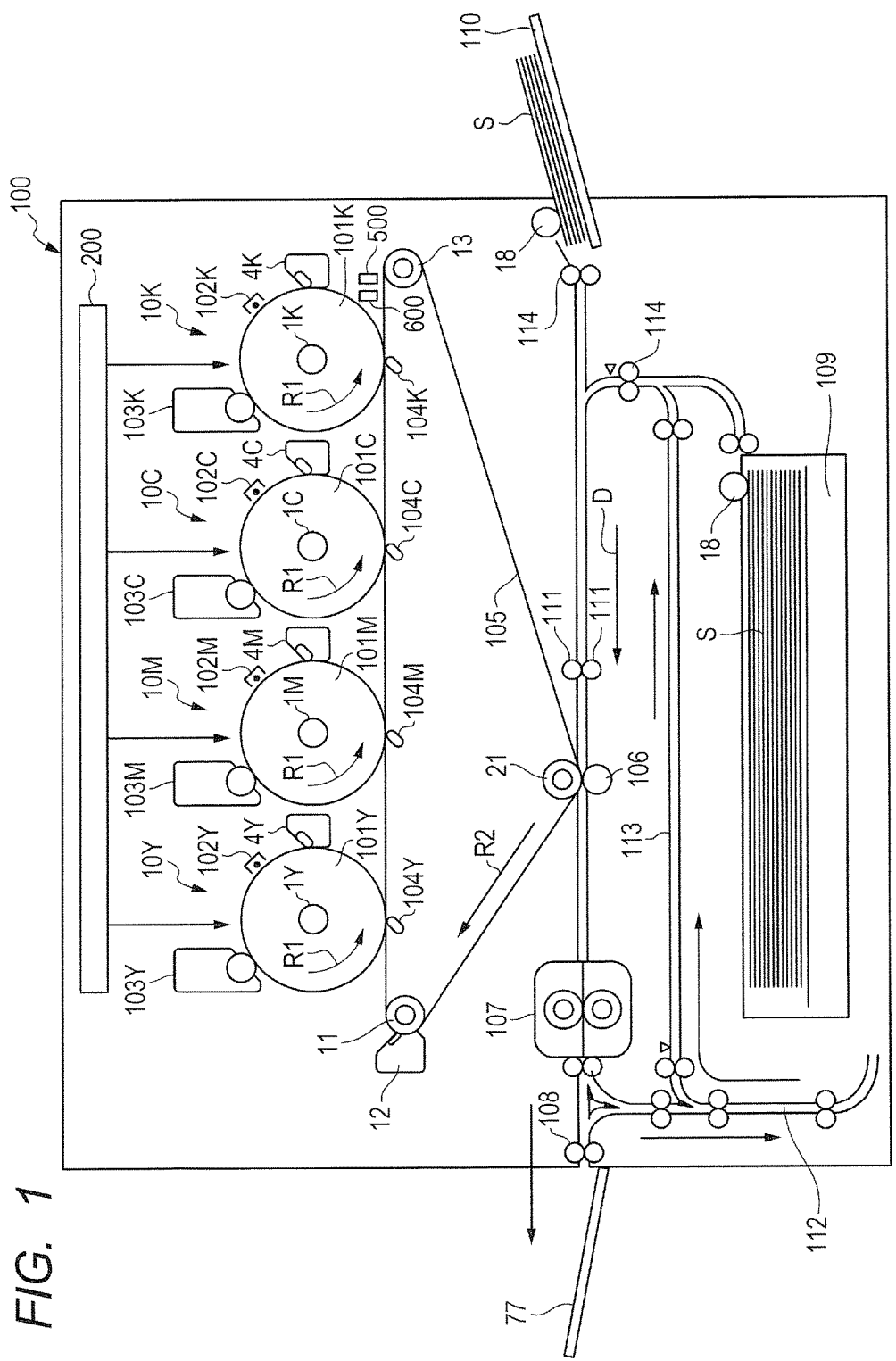
FIG. 1 is a sectional view of an image forming apparatus.

An image forming apparatus 100 is described first. FIG. 1 is a sectional view of the image forming apparatus 100. The image forming apparatus 100 is an electrophotographic digital full-color printer that uses toners of a plurality of colors to form an image on a recording medium (hereinafter referred to as "sheet"). The image forming apparatus 100 can operate at a plurality of image forming speeds. The image forming apparatus 100 includes four image forming portions 10 (10Y, 10M, 10C, and 10K). The image forming portion 10Y is configured to form a yellow image with the use of a yellow toner. The image forming portion 10M is configured to form a magenta image with the use of a magenta toner. The image forming portion 10C is configured to form a cyan image with the use of a cyan toner. The image forming portion 10K is configured to form a black image with the use of a black toner. The suffixes Y, M, C, and K in the reference symbols represent yellow, magenta, cyan, and black, respectively. In the following description, the suffixes Y, M, C, and K in the reference symbols may be omitted when the suffixes are not particularly necessary. The four image forming portions 10 have the same structure except for the color of the developer (toner).

Each image forming portion 10 has a photosensitive drum (image bearing member) 101 serving as a photosensitive member. The photosensitive drum 101 rotates about a rotation axis 1 in a direction indicated by an arrow R1 of FIG. 1 when an image is formed. A charging device 102, a light scanning device 200, a developing device 103, a primary transfer device 104, and a drum cleaning device 4 are arranged around the photosensitive drum 101. An intermediate transfer member (hereinafter referred to as "bearing member belt") 105, which is an endless belt, is arranged below the photosensitive drum 101. The bearing member belt 105 is stretched over a drive roller 11, a driven roller 13, and a secondary transfer opposite roller 21. The bearing member belt 105 rotates in a direction indicated by an arrow R2 of FIG. 1 when an image is formed. The primary transfer device 104, which serves as a transfer unit, is opposed to the photosensitive drum 101 through the bearing member belt 105. A secondary transfer roller 106 is opposed to the secondary transfer opposite roller 21 through the bearing member belt 105.

The bearing member belt 105 in a first embodiment is an intermediate transfer member onto which toner images are transferred in primary transfer by the primary transfer device 104, and from which the toner images are transferred in secondary transfer onto a sheet S by the secondary transfer roller 106. However, the bearing member belt 105 is not limited thereto, and can be, for example, a sheet conveying belt configured to convey the sheet S onto which toner images are transferred directly from the photosensitive drum 101.

A section that is downstream of the image forming portions 10 and that is near the bearing member belt 105 is provided with pattern sensors (pattern detection units) 500, which are optical sensors configured to detect given registration correction patterns 501 that are formed on the bearing member belt 105. The pattern sensors 500 are described later. The section that is downstream of the image forming portions 10 and that is near the bearing member belt 105 is provided also with a density sensor (density detection unit) 600, which is an optical sensor configured to detect given density correction patterns 601 that are formed on the bearing member belt 105. The density sensor 600 is described later. A section that is upstream of the image forming portions 10 and that is near the bearing member belt 105 is provided with a belt cleaning device 12 configured to remove residual toner that remains on the bearing member belt 105 after secondary transfer.

A feeding cassette 109 configured to contain the sheet S is arranged in a lower part of the image forming apparatus 100. A manual feeding tray 110 on which the sheet S is put is arranged in the side of the image forming apparatus 100. The sheet S is fed from the feeding cassette 109 by a pickup roller 18 of the feeding cassette 109, or from the manual feeding tray 110 by a pickup roller 18 of the manual feeding tray 110. The sheet S is conveyed to the secondary transfer roller 106 by conveying rollers 114 and by registration rollers 111. A fixing device 107 is arranged downstream of the secondary transfer roller 106 in a conveying direction D of the sheet S. A discharge tray 77 is provided on the downstream side of the fixing device 107 in the conveying direction D of the sheet S, and the sheets S with images formed thereon are stacked on the discharge tray 77.

(Image Forming Process)

An image forming process of the image forming apparatus 100 is described next. The four image forming portions 10 execute the same image forming process, and an image forming process in the yellow image forming portion 10Y is therefore described. Descriptions on image forming processes in the magenta image forming portion 10M, the cyan image forming portion 10C, and the black image forming portion 10K are omitted. The photosensitive drum 101Y rotates in the direction indicated by the arrow R1. The charging device 102Y charges a surface of the photosensitive drum 101Y uniformly. The light scanning device 200 emits laser light (hereinafter referred to as "light beam") that is modulated based on yellow component image data. The modulated light beam is used to form an electrostatic latent image on the uniformly charged surface of the photosensitive drum 101Y. The light scanning device 200 adjusts the light intensity of the light beam in accordance with the environment of the image forming apparatus 100 and the deterioration of the photosensitive drum 101Y so that the formed electrostatic latent image has an appropriate electric potential. The developing device 103Y serving as a developing unit develops the electrostatic latent image with the use of a yellow toner to obtain a yellow toner image. The primary transfer device 104Y transfers the yellow toner image on the photosensitive drum 101Y onto the bearing member belt 105 in primary transfer. Residual toner remaining on the photosensitive drum 101Y after the primary transfer is removed by the drum cleaning device 4.

In a similar manner, a magenta toner image formed by the magenta image forming portion 10M is transferred to be overlapped with the yellow toner image on the bearing member belt 105 with precision. Subsequently, a cyan toner image and a black toner image are transferred in order, to be overlapped with the magenta toner image on the bearing member belt 105. Toner images of four colors are overlapped with one another on the bearing member belt 105 as a result.

The sheet S conveyed from the feeding cassette 109 or the manual feeding tray 110 is transferred to the secondary transfer roller 106 by the registration rollers 111, and the conveyance of the sheet S is timed with the transfer of the toner images onto the bearing member belt 105. The four-color toner images overlapped on the bearing member belt 105 are transferred at once onto the sheet S in secondary transfer by the secondary transfer roller 106. Thereafter, the sheet S bearing the toner images is conveyed to the fixing device 107. The fixing device 107 heats and pressurizes the sheet S to fix the toner images to the sheet S and form a full-color image on the sheet S. The sheet S with the image formed thereon is discharged onto the discharge tray 77 by discharge rollers 108.

In the case of double-sided printing, the sheet S having passed through the fixing device 107 is led to a double-sided inversion path 112, where the front side and back side of the sheet S are reversed, and is then conveyed to a double-sided path 113. The sheet S having traveled along the double-sided path 113 is conveyed again to the image forming portions 10 by the conveying rollers 114. An image is formed on the back side (a second side) of the sheet S in the same manner that is used to form an image on the front side (a first side) of the sheet S. The sheet S with an image formed on each side is discharged onto the discharge tray 77 by the discharge rollers 108.

The image forming apparatus 100 switches between a plurality of image forming speeds to use an image forming speed suitable for the paper type (paper quality, thickness, basis weight, or surface texture) of the sheet S and the image quality. In the case of thick paper or high image quality, for example, the image forming speed is switched to a low speed. In the case of thin paper or an image quality that gives priority to speediness, the image forming speed is switched to a high speed. The image forming speed is switched to a speed that is set for each page and that is included in an image forming job output from an image processing portion. The image processing portion is provided in the main body of the image forming apparatus 100.

(Light Scanning Device)

The light scanning device 200 serving as a light beam emitting device will be described. FIG. 2A, FIG. 2B, and FIG. 2C are explanatory diagrams of the light scanning device 200. FIG. 2A is a plan view for schematically illustrating components that are arranged inside the light scanning device 200. FIG. 2B is a side view for illustrating light paths of light beams 221Y, 221M, 221C, and 221K from a rotary polygon mirror 205 to the photosensitive drums 101. FIG. 2C is a diagram for illustrating the arrangement of laser emitting elements (hereinafter referred to as "light sources") 201Y, 201M, 201C, and 200K that is viewed from an arrow 2C of FIG. 2A. As illustrated in FIG. 2C, the light scanning device 200 has four light sources 201Y, 201M, 201C, and 201K, which correspond to yellow, magenta, cyan, and black, respectively.

The light scanning device 200 includes the light sources 201Y, 201M, 201C, and 201K, collimator lenses 202Y, 202M, 202C, and 202K, diaphragms 203Y, 203M, 203C, and 203K, cylindrical lenses 204Y, 204M, 204C, and 204K, the rotary polygon mirror 205, a drive motor 206, toric lenses 207, diffractive optical elements 208, and reflecting mirrors 209, 130, and 131. The light sources 201Y, 201M, 201C, and 201K emit light beams 220Y, 220M, 220C, and 220K, respectively, at intensities determined by pieces of image data of their respective color components. The collimator lenses 202Y, 202M, 202C, and 202K convert the light beams 220Y, 220M, 220C, and 220K emitted from the light sources 201Y, 201M, 201C, and 201K into substantially parallel light beams, respectively. The diaphragms 203Y, 203M, 203C, and 203K restrict the light beams 220Y, 220M, 220C, and 220K, respectively. The cylindrical lenses 204Y, 204M, 204C, and 204K have a given refractive power (a given degree of refraction) only in a sub-scanning direction, and form elliptical images that are long in a main scanning direction from the light beams 220Y, 220M, 220C, and 220K, respectively, on a reflecting surface of the rotary polygon mirror 205. Light paths of the light beams 220Y and 220K from the light sources 201Y and 201K to the rotary polygon mirror 205 are parallel to each other. Light paths of the light beams 220M and 220C from the light sources 201M and 201C to the rotary polygon mirror 205 are parallel to each other. The light beam 220Y and the light beam 220M enter the same reflecting surface of the rotary polygon mirror 205 in an oblique downward direction and in an oblique upward direction, respectively. The light beam 220K and the light beam 220C enter the same reflecting surface of the rotary polygon mirror 205 in an oblique downward direction and in an oblique upward direction, respectively. The reflecting surface on which the light beams 220Y and 220M enter and the reflecting surface on which the light beams 220C and 220K enter are different surfaces.

The rotary polygon mirror 205 serving as a deflection unit is rotated by the drive motor 206 at a constant speed in a direction that is indicated by an arrow R3 of FIG. 2A. The light beams 220Y and 220M form images on a reflecting surface of the revolving rotary polygon mirror 205, and are deflected toward the left of the rotary polygon mirror 205. The deflected light beams 221Y and 221M are scanned in a main scanning direction that is indicated by an arrow X2 of FIG. 2A. The light beams 220C and 220K form images on another reflecting surface of the revolving rotary polygon mirror 205, and are deflected toward the right of the rotary polygon mirror 205. The deflected light beams 221C and 221K are scanned in a main scanning direction that is indicated by an arrow X1 of FIG. 2A. The main scanning direction X2 in which the light beams 221Y and 221M are scanned is reverse to the main scanning direction X1 in which the light beams 221C and 221K are scanned. The operation in which a plurality of light beams are scanned in opposite directions in this manner is hereinafter referred to as "opposite scanning".

The position of each photosensitive drum 101 is set so that the center of the photosensitive drum 101 in the direction of its axis line is at a point where the corresponding light beam is reflected at 90° when viewed from the corresponding light source 201. An image is formed so that the center of the photosensitive drum 101 in the axis line direction matches the center of the image. When the corresponding light beam 221 irradiates the center of the photosensitive drum 101, the corresponding light beam 220 emitted from the corresponding light source 201 enters a reflecting surface of the rotary polygon mirror 205 at an angle of 45° with respect to the reflecting surface, and is reflected in a direction of 90° with respect to the optical axis of the corresponding light beam 220. The light beam 221Y reflected by the rotary polygon mirror 205 passes through the toric lens 207a and the diffractive optical element 208a, is reflected by the reflecting mirror 209a, and irradiates the photosensitive drum 101Y. The light beam 221M reflected by the rotary polygon mirror 205 passes through the toric lens 207a and the diffractive optical element 208a, is reflected by the reflecting mirrors 130a and 131a, and irradiates the photosensitive drum 101M. The image formed with the light beam 221Y on the photosensitive drum 101Y and the image formed with the light beam 221M on the photosensitive drum 101M are in the same position in the main scanning direction X2. The light beam 221C reflected by the rotary polygon mirror 205 passes through the toric lens 207b and the diffractive optical element 208b, is reflected by the reflecting mirrors 130b and 131b, and irradiates the photosensitive drum 101C. The light beam 221K reflected by the rotary polygon mirror 205 passes through the toric lens 207b and the diffractive optical element 208b, is reflected by the reflecting mirror 209b, and irradiates the photosensitive drum 101K. The image formed with the light beam 221C on the photosensitive drum 101C and the image formed with the light beam 221K on the photosensitive drum 101K are in the same position in the main scanning direction X1.

The toric lenses 207 (207a and 207b) are optical elements having fθ characteristics, and serve as refractive members having a refraction index that differs in the main scanning direction and the sub-scanning direction. The front lens surface and back lens surface of each toric lens 207 in the main scanning direction have an aspherical shape. The diffractive optical elements 208 (208a and 208b) are optical elements having fθ characteristics, and serve as elongated diffractive members having a magnification that differs in the main scanning direction and the sub-scanning direction.

The light beam 220K emitted from the light source 201K outside an image forming area is reflected by the rotary polygon mirror 205, and the reflected light beam, which is denoted by 222K, enters a beam detector (hereinafter abbreviated as "BD") 214. The BD 214 serving as a beam detection unit receives the light beam 222K, and generates a synchronization signal for keeping a writing start position of an electrostatic latent image on the photosensitive drum 101K which is scanned by the light beam 221K at a constant position in the main scanning direction (hereinafter referred to as "BD signal"). The light beam 221K and the light beam 221C have the same writing start position, and the writing of images with the light beam 221K and 221C is therefore started after a given length of time elapses since the detection of the BD signal output by the BD 214. The writing of images with the light beams 221Y and 221M is also started based on the BD signal of the BD 214. The light beam 221Y and the light beam 221M are scanned in a scanning direction reverse to the scanning direction of the light beam 221K and the light beam 221C to form images based on the BD signal of the BD 214, as though a virtual light beam 222Y entered a virtual BD 215 and a virtual BD signal were output. A reflecting surface of the rotary polygon mirror 205 that deflects the light beam 222K entering the BD 214 differs from a reflecting surface of the rotary polygon mirror 205 that deflects the light beams 221Y and 221M at that moment, and thus the virtual BD signal of the virtual BD 215 differs from the actual BD signal of the actual BD 214. Writing start timing of the light beams 221Y and 221M is therefore calculated by adding a given length of time to, or subtracting the given length of time from, writing start timing (emission start timing) that is generated based on the actual BD signal of the actual BD 214. This causes the position of a yellow image formed with the light beam 221Y and a magenta image formed with the light beam 221M to match the position of a black image formed with the light beam 221K and a cyan image formed with the light beam 221C, thereby preventing color misregistration.

Light spots of light beams emitted from the light sources 201Y, 201M, 201C, and 201K and deflected by the rotary polygon mirror 205 in the main scanning directions travel on the surfaces of the photosensitive drums 101Y, 101M, 101C, and 101K which are charged uniformly by the charging devices 102Y, 102M, 102C, and 102K, respectively, in parallel to rotation axes 1Y, 1M, 1C, and 1K of the photosensitive drums 101Y, 101M, 101C, and 101K, respectively, in a linear pattern at a constant speed. Electric potentials on the surfaces of the photosensitive drums 101Y, 101M, 101C, and 101K vary depending on the intensities of the light beams. The photosensitive drums 101Y, 101M, 101C, and 101K are repeatedly scanned with light beams in the main scanning directions X1 and X2 while being rotated in a sub-scanning direction R1, which is perpendicular to the main scanning directions X1 and X2, thereby forming electrostatic latent images in the sub-scanning direction R1.

(Delay in Writing Start Timing)

Figure 3:
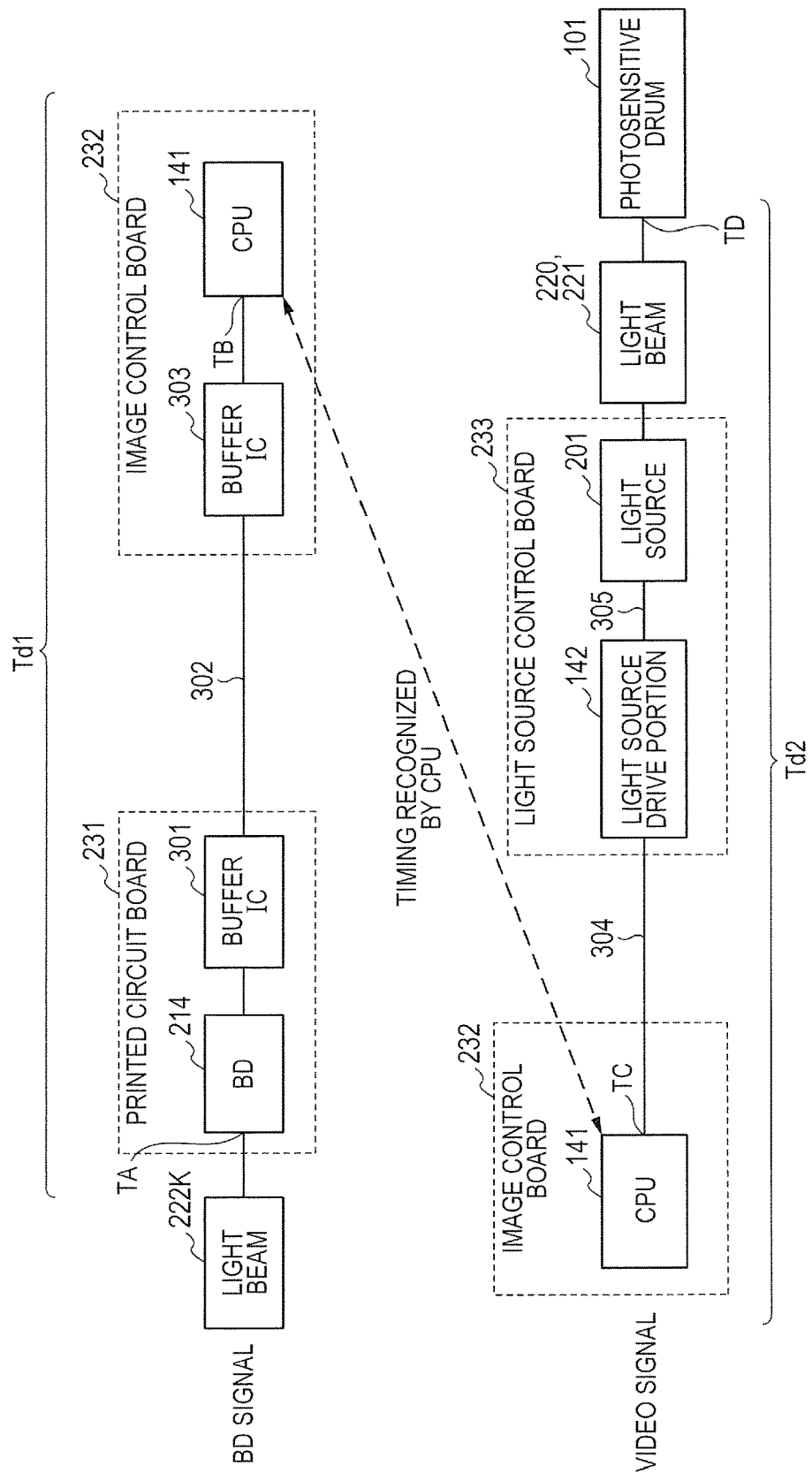
FIG. 3 is an explanatory diagram of a delay time of a BD signal and a delay time of a video signal.

With reference to FIG. 3, a description will be provided of a delay of the BD signal and a delay in writing start timing at which an electrostatic latent image is started to be written with a light beam on the surface of the photosensitive drum 101. FIG. 3 is an explanatory diagram of a delay time of the BD signal and a delay time of a video signal. To simplify the description, it is assumed here that each light scanning device 200 is assembled with a mechanically ideal precision. The BD 214 and a buffer IC 301 are provided on a printed circuit board 231 of each light scanning device 200. A CPU (control portion) 141 and a buffer IC 303 are provided on an image control board 232, which is provided in the main body of the image forming apparatus 100. The printed circuit board 231 of each light scanning device 200 and the image control board 232 in the main body of the image forming apparatus 100 are electrically connected by a wire harness 302. A light source control board 233 of each light scanning device 200 is provided with a light source drive portion 142 serving as a light source drive unit configured to drive the corresponding light source 201, and the corresponding light source 201. The image control board 232 in the main body of the image forming apparatus 100 and the light source control board 233 of each light scanning device 200 are electrically connected by a wire harness 304.

First, the BD 214 receives the light beam 222K (TA), performs photoelectric conversion on the light beam 222K, and outputs the resultant electric charges as a BD signal. The photoelectric conversion in the BD 214 causes a delay. The BD signal is next input to the buffer IC 301. The rise time or fall time of the BD signal is generally about several tens of nanoseconds (ns). A delay is caused at this point which equals the length of time till the BD signal reaches a threshold for detecting the high (H) level or low (L) level of the buffer IC 301. This delays the output of the BD signal from the buffer IC 301. The BD signal next travels the wire harness 302, and causes a delay till the BD signal reaches the image control board 232 on which the CPU 141 is provided. A further delay is caused when the BD signal passes through the buffer IC 303 on the image control board 232 in order to perform waveform shaping of the BD signal. The CPU 141 detects the BD signal from the buffer IC 303 (TB). A delay time Td1 is accordingly created in a time period from the time TA at which the VD 214 is scanned with the light beam 222K till the time TB at which the CPU 141 detects the BD signal.

The CPU 141 serving as a controller detects the BD signal (TB), and determines timing to output a light source drive signal (hereinafter referred to as "video signal") for driving the light sources in a manner that is determined by image data. Internal circuits of the CPU 141 also cause a slight delay. The CPU 141 outputs the video signal based on the BD signal (TC). The video signal output from the CPU 141 is transmitted through the wire harness 304 to the light source drive portion 142 of the light source control board 233. A delay corresponding to the length of the wire harness 304 is caused in the transmission of the video signal. The light source drive portion 142 receives the video signal, and applies a drive current 305 to the corresponding light source 201 in an amount determined by the video signal. The application of the drive current 305 causes a delay. A light emission delay till the corresponding light beam 220 is emitted from the light source 201 to which the drive current 305 is applied is further caused. The corresponding light beam 220 is deflected by the rotary polygon mirror 205. The corresponding light beam 221 resulting from the deflection at the rotary polygon mirror 205 is used to write an electrostatic latent image on the surface of the corresponding photosensitive drum 101 (TD). A delay time Td2 is accordingly created in a time period from the time TC at which the CPU 141 outputs the video signal till the time TD at which an electrostatic latent image is written on the surface of the corresponding photosensitive drum 101.

In FIG. 3, the CPU 141 treats the BD signal and the video signal as signals on the same timeline. Registration correction in the main scanning direction is conducted by the CPU 141 by adjusting, based on the color misregistration amount, video signal output timing (writing start timing), which is determined based on the BD signal. When an image is formed, a circuit delay time Td, which includes the delay time Td1 and delay time Td2 that are described above, is included in a time period from the time TA at which the BD 214 is scanned with the light beam 222K till the time TD at which an electrostatic latent image is written with the corresponding light beam 221 on the surface of the corresponding photosensitive drum 101. The adjustment of the video signal output timing (writing start timing) for registration correction in the main scanning direction is performed also based on data inclusive of the circuit delay time Td, which includes the delay time Td1 and the delay time Td2.

(Image Position Misregistration Due to the Circuit Delay Time Td)

Figure 4:
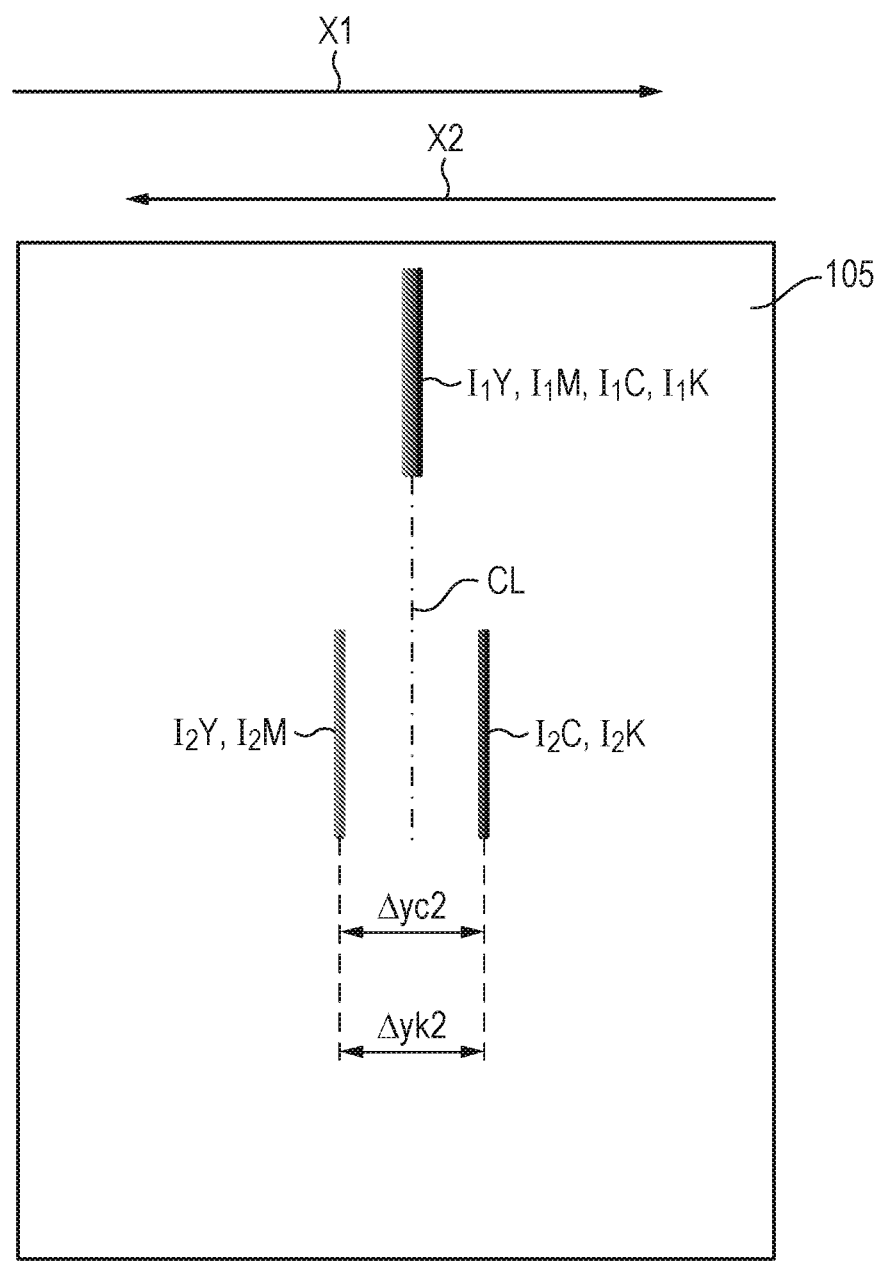
FIG. 4 is an explanatory diagram of image position misregistration caused by a circuit delay time.

Image position misregistration (color misregistration) due to the circuit delay time Td is described next with reference to FIG. 4. FIG. 4 is an explanatory diagram of image position misregistration due to the circuit delay time Td. The image position misregistration (hereinafter referred to as "color misregistration") occurs when a first image forming speed is switched to a second image forming speed. With the light scanning device 200 being of opposed-scanning-type as described above, the light beams 221C and 221K (hereinafter referred to as "CK light beams") are scanned in the main scanning direction X1 based on the BD signal of the BD 214 (hereinafter referred to as "CK-BD signal"). The light beams 221Y and 221M (hereinafter referred to as "YM light beams") are scanned in the main scanning direction X2, which is reverse to the main scanning direction X1, based on a BD signal that is generated based on the CD-BD signal of the BD 214 and a given length of time (the generated BD signal is hereinafter referred to as "YM-BD signal").

First, registration correction is conducted in the main scanning directions at the first image forming speed to determine first-speed writing start timing. Images $I_1Y$, $I_1M$, $I_1C$, and $I_1K$ are a yellow image, a magenta image, a cyan image, and a black image, respectively, that are formed on the bearing member belt 105 at the first image forming speed, based on the determined first-speed writing start timing and on data at an image center point. The images $I_1Y$, $I_1M$, $I_1C$, and $I_1K$, which are formed after registration correction is conducted at the first image forming speed, are formed at an image center CL without color misregistration. The first image forming speed is then switched to the second image forming speed. Without conducting registration correction in the main scanning directions at the second image forming speed, second-speed writing start timing is determined from the first-speed writing start timing and from the ratio of the first image forming speed and the second image forming speed. Images $I_2Y$, $I_2M$, $I_2C$, and $I_2K$ are a yellow image, a magenta image, a cyan image, and a black image, respectively, that are formed on the bearing member belt 105 at the second image forming speed, based on the determined second-speed writing start timing and on data at an image center point. There is substantially no color misregistration between the image $I_2Y$ and the image $I_2M$, and substantially no color misregistration is found between the image $I_2C$ and the image $I_2K$. However, the image $I_2C$ and the image $I_2K$ have color misregistration that moves away from the image center CL toward the downstream of the main scanning direction X1. The image $I_2Y$ and the image $I_2M$ also have color misregistration that moves away from the image center CL toward the downstream of the main scanning direction X2. When the color misregistration amount in the main scanning directions (hereinafter referred to as "main scanning misregistration amount") is expressed with the yellow image $I_2Y$ as a reference, a main scanning misregistration amount $\Delta ym2$ between the image $I_2Y$ and the image $I_2M$ is substantially zero. A main scanning misregistration amount $\Delta yc2$ between the image $I_2Y$ and the image $I_2C$ is substantially the same as a main scanning misregistration amount $\Delta yk2$ between the image $I_2Y$ and the image $I_2K$. Color misregistration due to the circuit delay time Td thus occurs in the case where images are formed after the image forming speed is changed in the opposed-scanning-type light scanning device 200 by determining changed-speed writing start timing based on the speed ratio alone, without conducting registration correction in the main scanning directions.

As is understood from FIG. 4, when scanning directions of light beams of a plurality of colors are the same direction with respect to the recording medium, for example, the light beams of all colors are misaligned in the same direction, and there is less chance for the misalignment to be recognized as color misregistration. However, when the scanning direction of one light beam is reverse to the scanning direction of another light beam with respect to the recording medium as in the opposite scanning type light scanning device 200, the circuit delay time Td causes color misregistration in one direction and color misregistration in the opposite direction, and thus the color misregistration is noticeable.

Figure 5A:
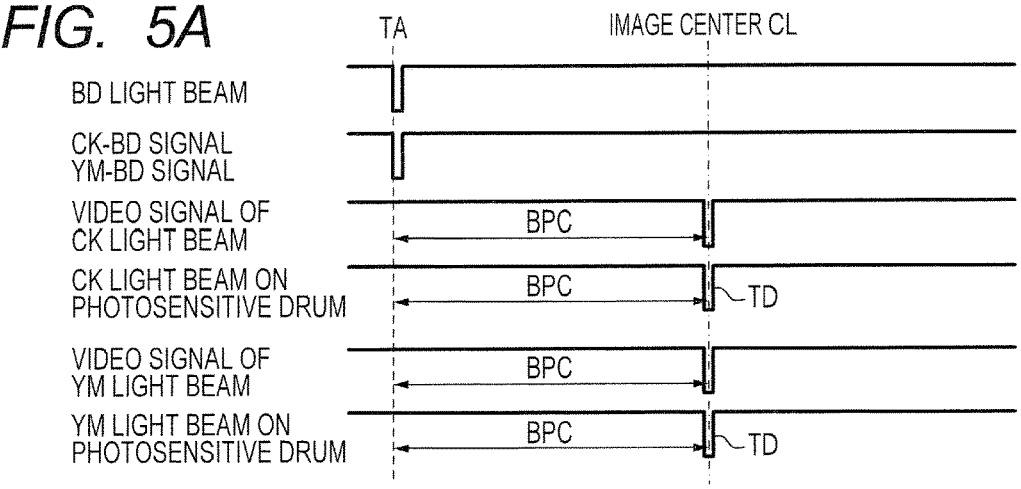
FIG. 5A, FIG. 5B, and FIG. 5C are timing charts for illustrating a relation between the delay times and center image writing start timing.
Figure 5B:
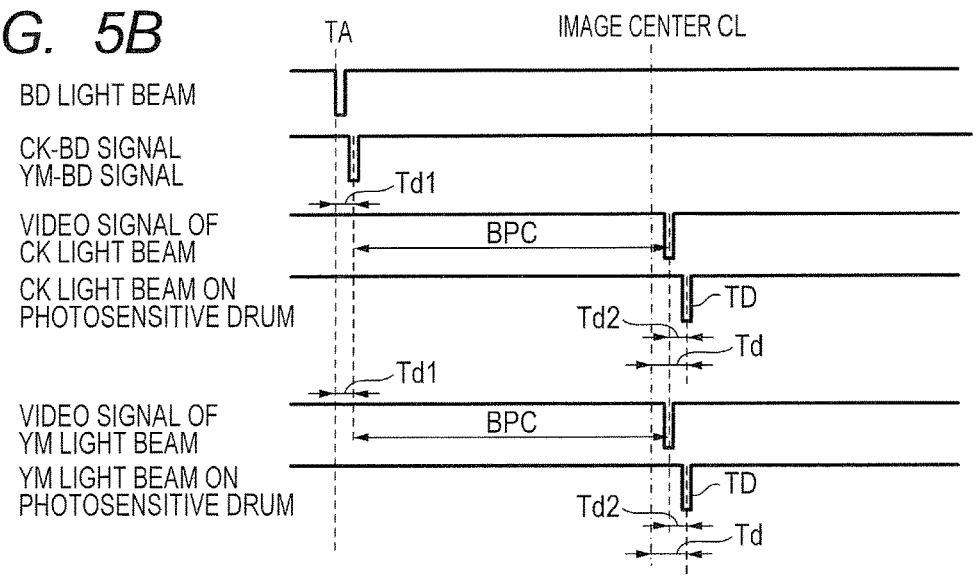
Figure 5C:
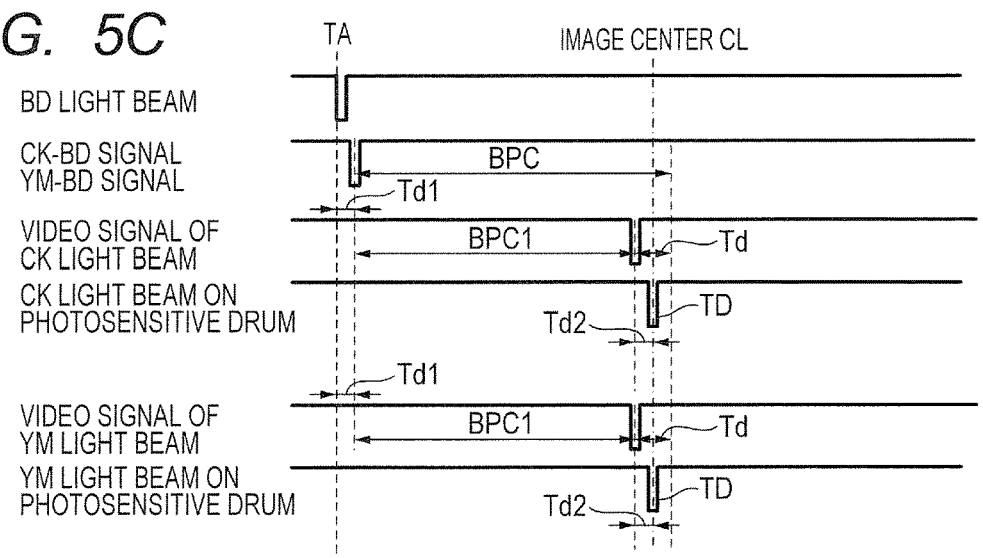

A correction method for preventing color misregistration that is due to the circuit delay time Td is described below with reference to FIG. 5A, FIG. 5B, and FIG. 5C. FIG. 5A, FIG. 5B, and FIG. 5C are timing charts for illustrating a relation between the delay times Td1, Td2, and Td and center image writing start timing BPC and center image writing start timing BPC1. The case illustrated in FIG. 5A is an ideal case in which the circuit delay time Td is zero in a time period from the time TA at which the BD 214 is scanned with the light beam (hereinafter referred to as "BD light beam") 222K till the time TD at which center electrostatic latent images are written with the light beams (CK light beams and YM light beams) 221 on the surfaces of the photosensitive drums 101. When the BD 214 is scanned with the BD light beam 222K emitted from the light source 201K, the BD 214 outputs the CK-BD signal, and the CPU 141 detects the CK-BD signal without a delay. When the given center image writing start timing BPC passes after the CK-BD signal is output, the CPU 141 outputs a video signal for the CK light beams. The light source drive portion 142 receives the video signal, and emits the CK light beams from the light sources 201C and 201K to write latent images of center images on the surfaces of the photosensitive drums 101C and 101K without a delay. Although no BD is provided on the side where the light sources 201Y and 201M emit YM light beams, a video signal is output when the given center image writing start timing BPC passes after the YM-BD signal, which is generated based on the CK-BD signal of the BD 214 and a given length of time, is output. The CK-BD signal and the YM-BD signal that are illustrated in FIG. 5A, FIG. 5B, and FIG. 5C have the same waveform for the sake of convenience. The YM light beams are used in a similar manner to write latent images of center images on the surfaces of the photosensitive drums 101Y and 101M without a delay. Accordingly, in an ideal case, the length of time from the time TA at which the BD 214 is scanned with the BD light beam 222K till the time TD at which center electrostatic latent images are formed with the light beams 221 on the surfaces of the photosensitive drums 101 is equal to the length of time till the given center image writing start timing BPC is reached.

However, the circuit delay time Td described above is created in actual cases. In the case illustrated in FIG. 5B, the circuit delay time Td is created in a time period from the time TA at which the BD 214 is scanned with the BD light beam 222K till the time TD at which center electrostatic latent images are formed with the light beams 221 on the surfaces of the photosensitive drums 101. The delay time Td1 is created in a time period from the time TA at which the BD 214 is scanned with the BD light beam 222K till the time when the CPU 141 detects the CK-BD signal. The CPU 141 outputs a video signal for the light beams 220Y and 220M when the given center image writing start timing BPC passes after the CK-BD signal is output. However, the delay time Td2 is created in a time period from the time when the CPU 141 outputs the video signal till the time TD at which electrostatic latent images are formed on the surfaces of the photosensitive drums 101. Consequently, the circuit delay time Td is created, which includes the delay times Td1 and Td2, in a time period from the time TA at which the BD 214 is scanned with the BD light beam 222K till the time TD at which center electrostatic latent images are formed with the light beams 221 on the surfaces of the photosensitive drums 101. The writing position at which the center electrostatic latent images are written is shifted by an amount corresponding to the circuit delay time Td.

The writing position at which the center electrostatic latent images are written is therefore corrected by subtracting the circuit delay time Td from the given center image writing start timing BPC as illustrated in FIG. 5C. The center image writing start timing BPC1 is calculated by subtracting the circuit delay time Td from the given circuit image writing timing BPC. By outputting the video signal when the center image writing start timing BPC1 passes after the CPU 141 detects the CK-BD signal, the center electrostatic latent images can successfully be written at the image center CL.

Figure 6A:
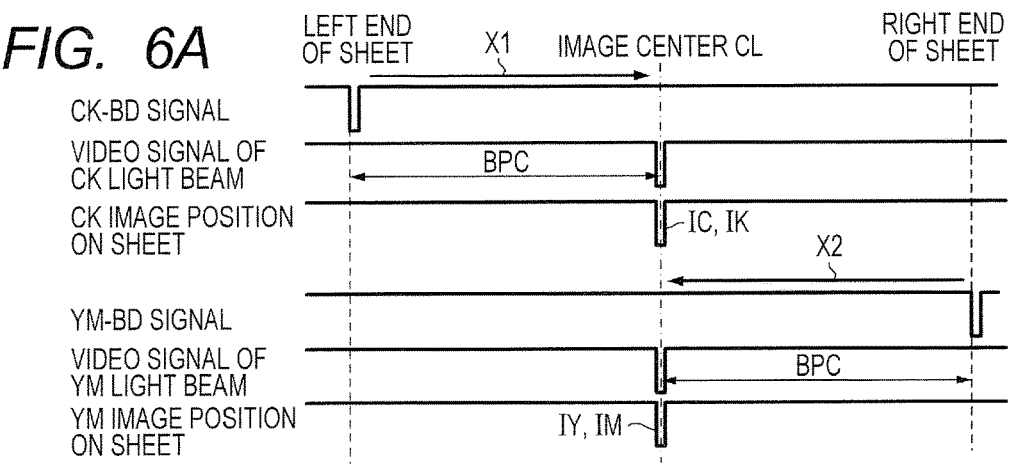
FIG. 6A, FIG. 6B, and FIG. 6C are timing charts of light beams in main scanning directions in which a sheet is used as a reference.
Figure 6B:
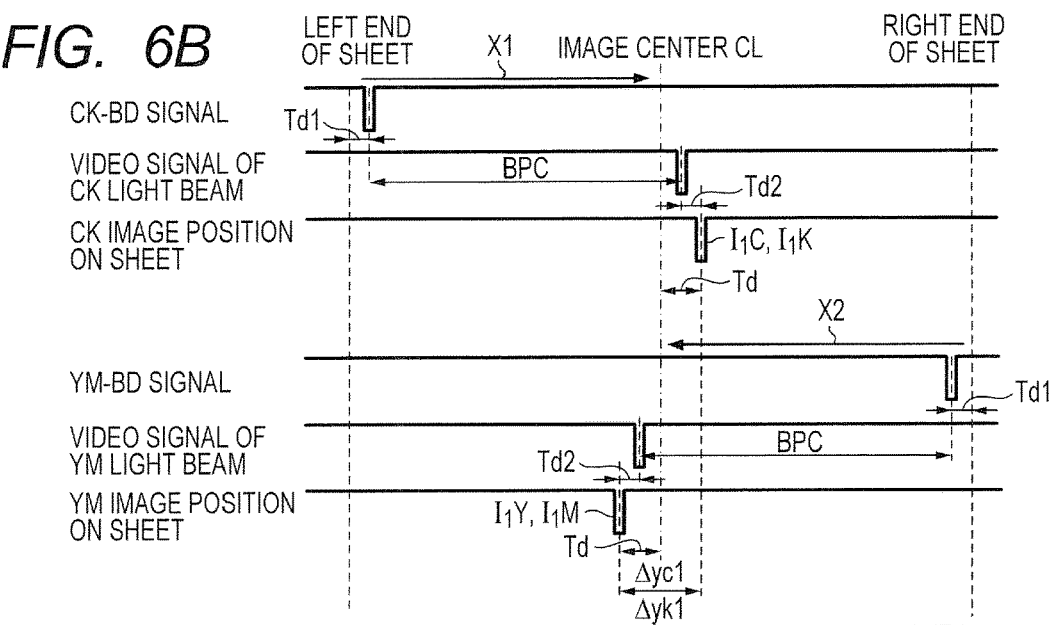
Figure 6C:
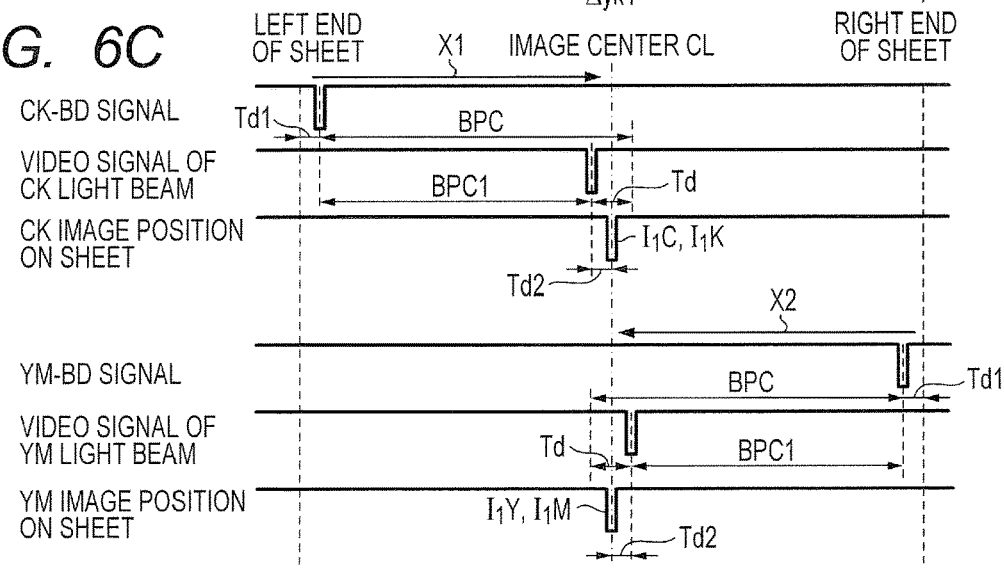

A description will be hereinafter provided of color misregistration on the sheet S that results from the fact that the main scanning direction X1 of the CK light beams and the main scanning direction X2 of the YM light beams are reverse to each other in the opposed-scanning-type light scanning device 200. FIG. 6A, FIG. 6B, and FIG. 6C are timing charts of the light beams 220 in the main scanning directions in which the sheet is used as a reference. The CK-BD signal is a signal output from the BD 214 when the BD 214 is scanned with the BD light beam 222K. The YM-BD signal is a BD signal for the YM light beams which is generated based on the CK-BD signal and a given length of time. In the case where the detection of the CK-BD signal by the CPU 141 has the delay time Td1, the delay time Td1 is similarly created in the generation of the YM-BD signal. The CK light beams are emitted from the light sources 201C and 201K in response to a video signal that is output based on the CK-BD signal. The CK light beams are scanned in the main scanning direction X1 from the left end of the sheet to the right end of the sheet. The YM light beams, on the other hand, are output from the light sources 201Y and 201M in response to a video signal that is output based on the YM-BD signal. The YM light beams are scanned in the main scanning direction X2, which is reverse to the main scanning direction X1 of the CK light beams, from the right end of the sheet to the left end of the sheet.

The case of FIG. 6A is an ideal case in which the circuit delay time Td is zero, and BD signals, video signals, and image positions on the sheet S that are used in the ideal case are illustrated in FIG. 6A. A video signal for center images of the CK light beams is output when the given center image writing start timing BPC passes after the CK-BD signal is output, thereby forming the images IC and IK at the image center CL on the sheet S. Similarly, a video signal for center images of the YM light beams is output when the given center image writing start timing BPC passes after the YM-BD signal is output, thereby forming the images IY and IM at the image center CL on the sheet S. The image positions of the images IY, IM, IC, and IK of four colors thus match one another at the image center CL.

BD signals, video signals, and image positions on the sheet S that are used when the circuit delay time Td is not zero are illustrated in FIG. 6B. The light beam C and the light beam K in the CK light beams are scanned in the same main scanning direction X1, and the circuit delay time Td till the image $I_1C$ is formed and the circuit delay time Td till the image $I_1K$ is formed which are measured from the image center CL are substantially the same as well. The images $I_1C$ and $I_1K$ are accordingly formed at substantially the same position in the main scanning direction X1 on the sheet S. The light beam Y and the light beam M in the YM light beams are scanned in the same main scanning direction X2, and the circuit delay time Td till the image $I_1Y$ is formed and the circuit delay time Td till the image $I_1M$ is formed which are measured from the image center CL are substantially the same as well. The images $I_1Y$ and $I_1M$ are accordingly formed at substantially the same position in the main scanning direction X2 on the sheet S. However, because the YM light beams and the CK light beams are scanned in different main scanning directions, that is, the direction X2 and the direction X1, respectively, the images $I_1Y$ and are shifted from the image center CL in a direction reverse to the direction of the shift of the images $I_1C$ and $I_1K$. Main scanning misregistration amounts $\Delta yc1$ and $\Delta yk1$ between the images $I_1Y$ and $I_1M$ and the images $I_1C$ and $I_1K$ are twice larger than the amount of main scanning misregistration from the image center CL, and thus even a small signal delay time is recognizable as color misregistration.

In order to prevent color misregistration due to the circuit delay time Td, the given center image writing start timing BPC is corrected so that the images $I_1Y$, $I_1C$, and $I_1K$ formed on the sheet are positioned at the image center CL. The center image writing start timing BPC1 is obtained by subtracting the circuit delay time Td from the given center image writing start timing BPC as illustrated in FIG. 6C. The images $I_1Y$, $I_1M$, $I_1C$, and $I_1K$ of four colors can be positioned at the image center CL by outputting a video signal based on the center image writing start timing BPC1.

A description will be hereinafter provided of a correction amount $\Delta BD$ in a case where the image forming speed is changed from the first image forming speed to the second image forming speed in a state in which the light intensity of the light beams is kept constant. FIG. 7A and FIG. 7B are timing charts for illustrating a relation between the correction of the center image writing start timing BPC that is based on the speed ratio, and the correction amount $\Delta BD$. The correction of the given center image writing start timing BPC at which center images are started to be written in the main scanning directions is described here for easier understanding. However, the correction of the given center image writing start timing BPC is the same as the correction of first image writing start timing BPS which is conducted to start the writing of images at a constant position in the main scanning directions. In the case where a switch to the second image forming speed is made after writing start timing BPS1 is corrected by registration correction at the first image forming speed, writing start timing BPS2 at the second image forming speed is calculated by multiplying the corrected writing start timing BPS1 by the ratio of the first image forming speed and the second image forming speed. The following description is about a similar case in which the image forming speed is changed from the first image forming speed to the second image forming speed and the given center image writing start timing BPC is corrected based on the speed ratio. Numerical values in the following description are given as examples, and the first embodiment is not limited to the numerical values given below.

BD signals, video signals, and center image writing start timing in a case where an image forming speed is changed from a first image forming speed V1 to a second image forming speed V2 in a state in which the light intensity of the light beams is kept constant are illustrated in FIG. 7A and FIG. 7B. The second image forming speed V2 here is slower than the first image forming speed V1, and is set to a half of the first image forming speed V1 (V2=V1/2). FIG. 7A is a timing chart at the first image forming speed V1. At the first image forming speed V1, 100 µs is set as the given (ideal) center image writing start timing BPC, which requires a length of time from the output of an ideal BD signal 41 to the output of an ideal BD signal 51 to reach. The ideal BD signals 41 and 51 are ideal in that the circuit delay time Td is zero. The delay time Td1 till an actual BD signal 42 is detected by the CPU 141 since the ideal BD signal 41 is output is set to 1 µs. The delay time Td2 till images are formed at the image center CL since an actual video signal 52 is output is set to 1 µs. The circuit delay time Td (=Td1+Td2) is calculated from the delay time Td1 (=1 µs) of the BD signal and the delay time Td2 (=1 µs) of the video signal as 2 µs (=1 µs+1 µs). The corrected center image writing start timing BPC1 at the first image forming speed V1 is set to 98 µs by executing registration correction so that images represented by image center data are formed at the image center CL on the bearing member belt 105. The corrected center image writing start timing BPC1 is obtained by subtracting the circuit delay time Td (=2 µs) from the given center image writing start timing BPC (=100 µs) (BPC1=BPC−Td).

FIG. 7B is a timing chart at the second image forming speed V2. The speed ratio of the first image forming speed V1 and the second image forming speed V2 (V1/V2) is 2. At the second image forming speed V2, 200 µs (=100 µs×2) is set as the given (ideal) center image writing start timing BPC, which requires a length of time from the output of the ideal BD signal 41 to the output of the ideal BD signal 51 to reach. The ideal BD signals 41 and 51 are ideal in that the circuit delay time Td is zero. The given (ideal) center image writing start timing BPC is obtained by multiplying the given (ideal) center image writing start timing BPC at the first image forming speed V1 (BPC=100 µs) by the speed ratio (V1/V2=2) (=100 µs×2). If the center image writing start timing BPC1 at the first image forming speed V1 (BPC1=98 µs) is also multiplied by 2 based on the speed ratio (V1/V2=2), the resultant timing is 196 µs. However, center image writing start timing BPC2 for forming images at the image center CL at the second image forming speed V2 is 198 µs, which is obtained by subtracting the circuit delay time Td (=2 µs) from the given center image writing start timing BPC (=200 µs). In short, the center image writing start timing BPC2 is expressed by BPC2=BPC−Td. The timing 196 µs, which is obtained by multiplying the center image writing start timing BPC1 at the first image forming speed V1 by the speed ratio, is short of 198 µs, which is center image writing start timing BPC2 obtained by subtracting the circuit delay time Td from the given center image writing start timing BPC, by 2 µs. The shortage of 2 µs causes color misregistration. In other words, when the image forming speed is changed, it is not enough to simply multiply center image writing start timing by the speed ratio to prevent color misregistration, and the correction amount ΔBD for supplementing the lacking 2 µs needs to be calculated.

(Method of Calculating the Correction Amount ΔBD)

A method of calculating the correction amount ΔBD is described below. The calculation of the correction amount ΔBD is executed in a main scanning registration image forming speed correction mode. The image forming apparatus 100 is operated, after assembly, in the main scanning registration image forming speed correction mode at the factory. The image forming apparatus 100 may be operated in the main scanning registration image forming speed correction mode each time image forming is performed on a given number of sheets. The image forming apparatus 100 can operate in a registration correction mode before image forming operation is started. The registration correction mode is described later.

(Main Scanning Registration Image Forming Speed Correction Mode)

Figure 8:
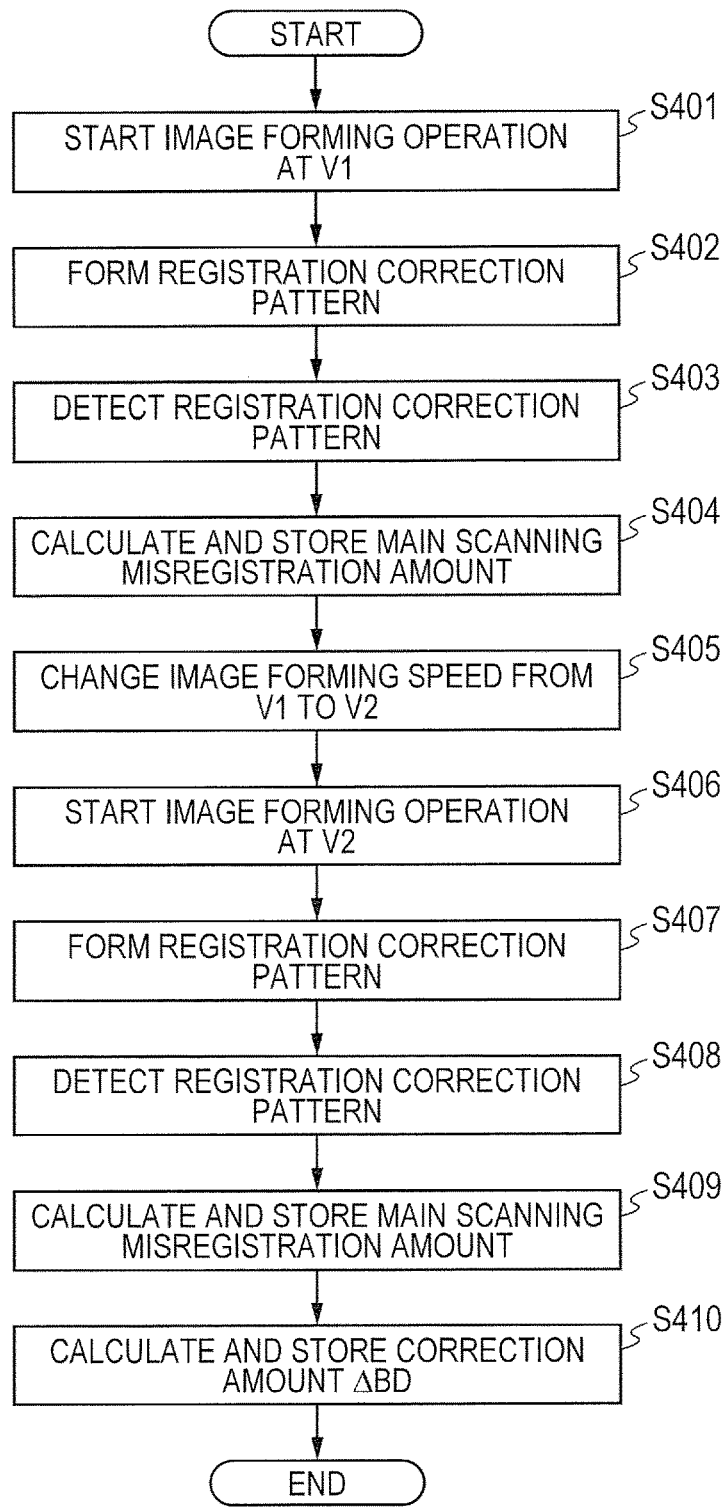
FIG. 8 is a flowchart of control operation in a main scanning registration image forming speed correction mode.
Figure 9:
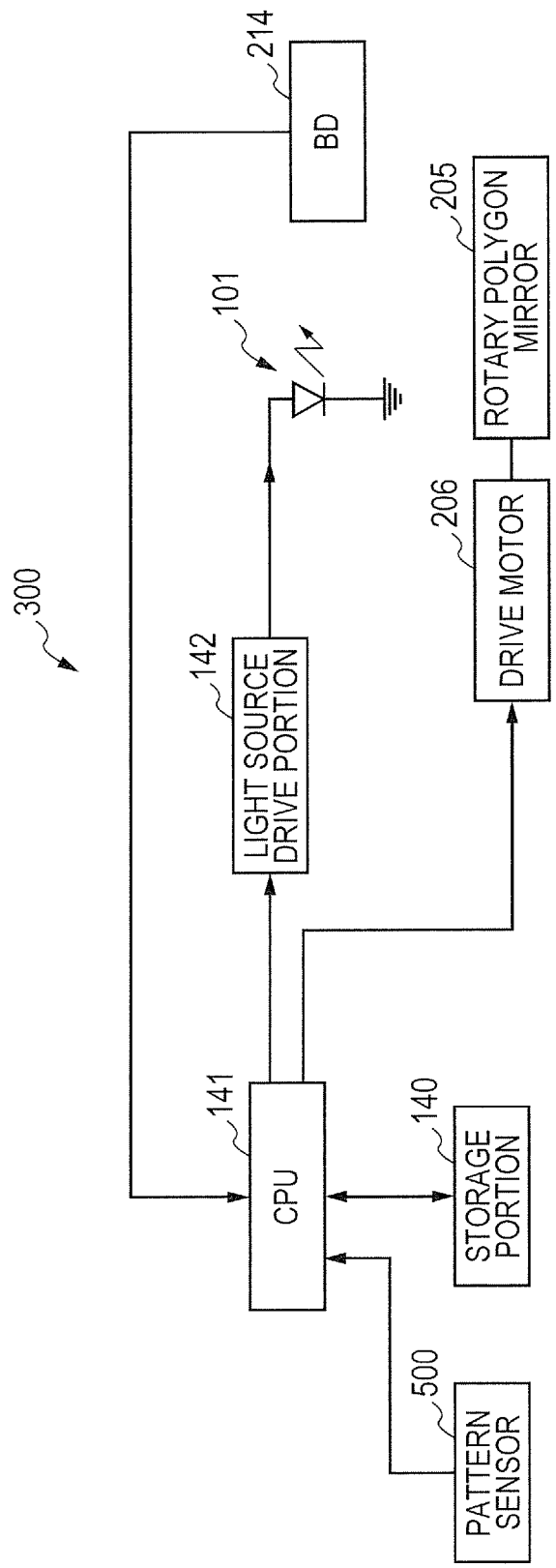
FIG. 9 is a block diagram of a control system.
Figure 10:
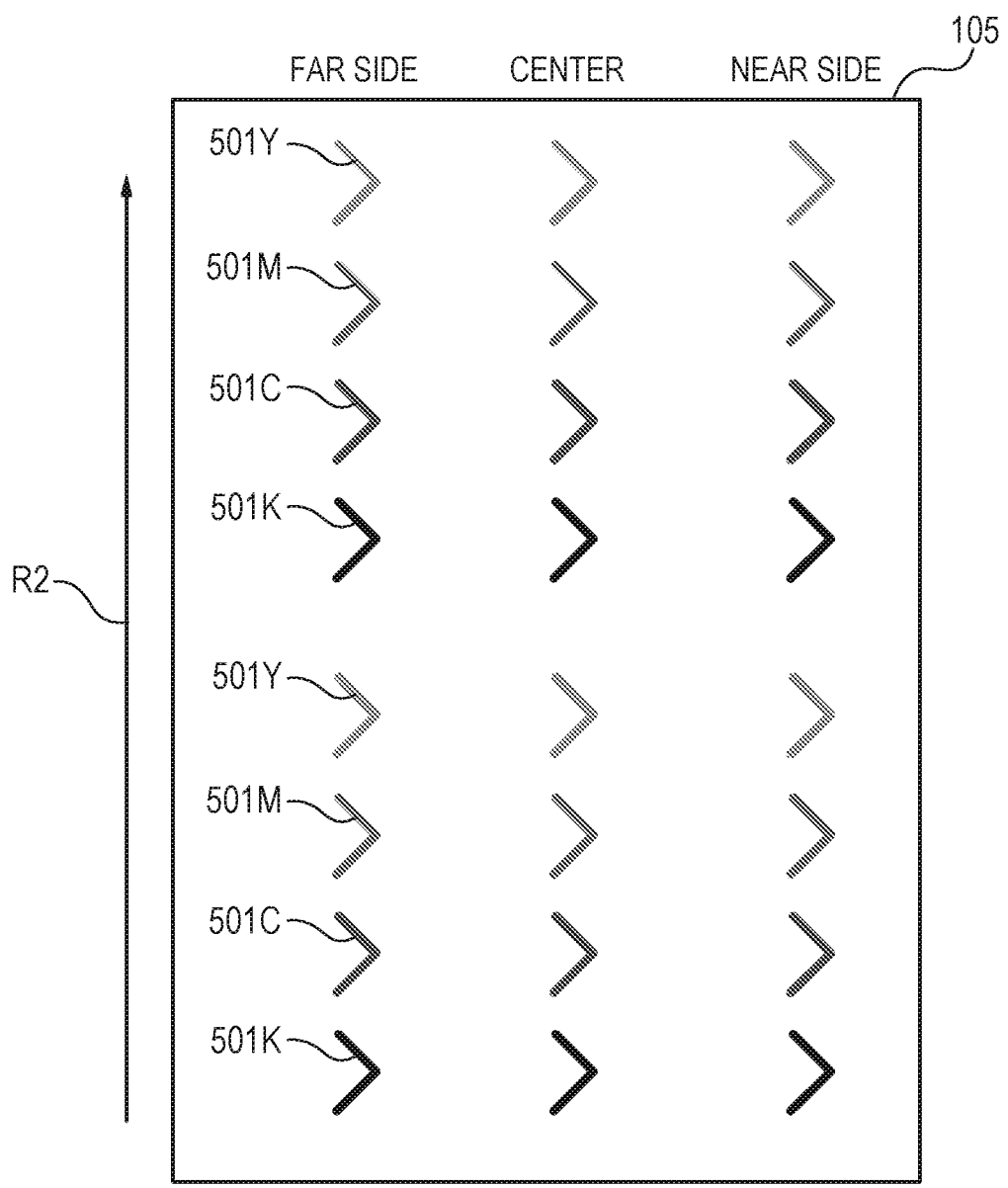
FIG. 10 is a diagram for illustrating registration correction patterns.
Figure 11:
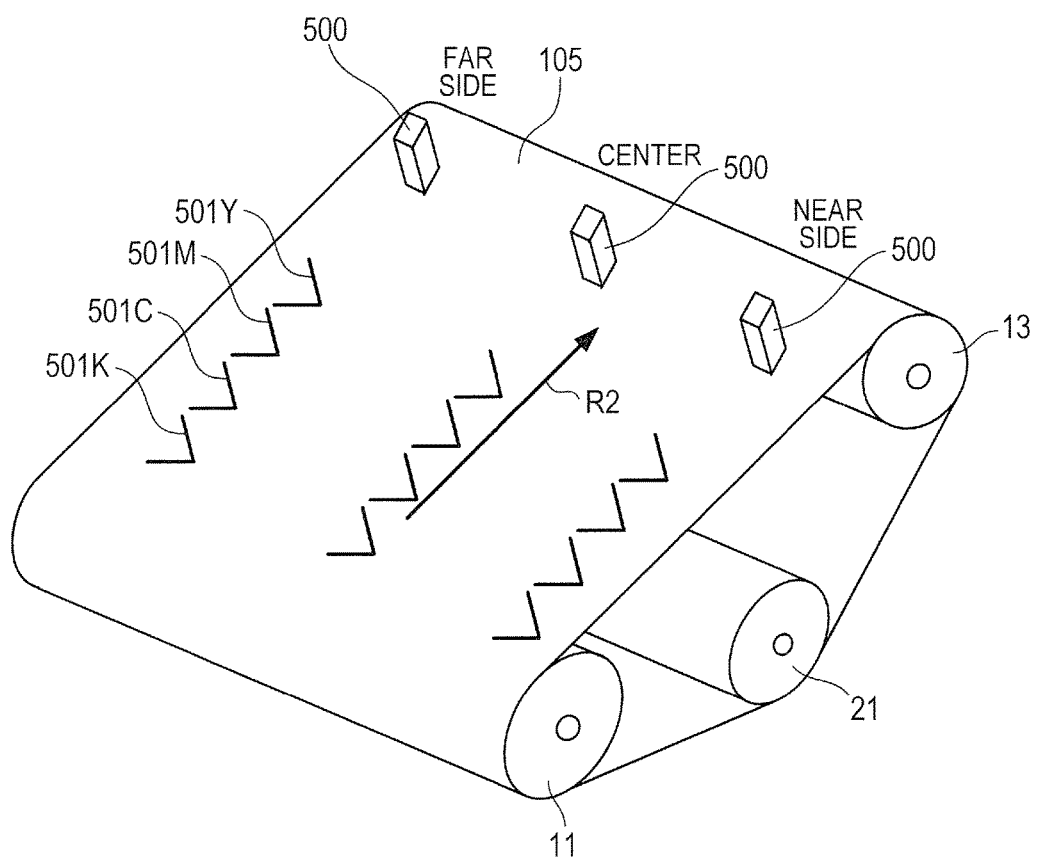
FIG. 11 is a diagram for illustrating registration correction patterns that are formed on a bearing member belt, and pattern sensors.

The main scanning registration image forming speed correction mode is described below with reference to FIG. 8, FIG. 9, FIG. 10, and FIG. 11. FIG. 8 is a flowchart of control operation in the main scanning registration image forming speed correction mode. FIG. 9 is a block diagram of a control system 300. FIG. 10 is a diagram for illustrating the registration correction patterns 501 (501Y, 501M, 501C, and 501K). FIG. 11 is a diagram for illustrating the registration correction patterns 501 that are formed on the bearing member belt 105, and the pattern sensors 500. The CPU 141 executes control operation in the main scanning registration image forming speed correction mode as programmed by a program that is stored in a storage portion 140 serving as a storage unit. It is preferred that the storage portion 140 include a ROM on which programs are stored and a RAM on which detected data and calculated data are stored. The operation of the image forming apparatus 100 in the main scanning registration image forming speed correction mode is started by an operation portion (not shown) or the CPU 141.

When the control operation in the main scanning registration image forming speed correction mode is started, the CPU 141 starts the image forming operation at the first image forming speed V1, which is set in advance (Step S401). The CPU 141 controls the drive motor 206, which is configured to rotate the rotary polygon mirror 205, so that the photosensitive drums 101 are scanned with light beams at a scanning speed SV1 corresponding to the first image forming speed V1. The CPU 141 uses the light beams to form electrostatic latent images on the surfaces of the photosensitive drums 101 in the registration correction patterns 501 illustrated in FIG. 10. The electrostatic latent images are developed with toners into toner images by the developing device 103. The toner images are transferred onto the bearing member belt 105 by the primary transfer device 104, and the registration correction patterns 501 are formed on the bearing member belt 105 (Step S402). The yellow, magenta, cyan, and black registration correction patterns 501Y, 501M, 501C, and 501K are formed in a plurality of sets in the rotation direction (conveying direction) R2 of the bearing member belt 105 which is the sub-scanning direction as illustrated in FIG. 10. The registration correction patterns 501 are arranged on the near side, at the center, and on the far side of the bearing member belt 105 as illustrated in FIG. 11. The pattern sensors 500 configured to detect the registration correction patterns 501 are arranged on the near side, at the center, and on the far side of the bearing member belt 105.

The registration correction patterns 501 are patterns formed of yellow toner, magenta toner, cyan toner, and black toner on the bearing member belt 105 in order to detect the amount of misregistration with respect to a predetermined reference color for the rest of the colors. The CPU 141 detects the registration correction patterns 501 with the use of the pattern sensors 500 (Step S403). The CPU 141 serving as a misregistration amount detection unit calculates the main scanning misregistration amount for each color from the detection timing of the registration correction patterns 501, and stores the calculated misregistration amounts in the storage portion 140 (Step S404). The reference color in the first embodiment is yellow (Y). The main scanning misregistration amounts (distances) of magenta (M), cyan (C), and black (K) with respect to yellow (Y) at the first image forming speed V1 are denoted by Δym1, Δyc1, and Δyk1, respectively. In the case of the four-color and opposed-scanning-type light scanning device 200 of the first embodiment which is illustrated in FIG. 2A, Δym1 is substantially 0, and Δyc1 and Δyk1 have substantially the same value.

The CPU 141 next changes the image forming speed from the first image forming speed V1 to the second image forming speed V2 (Step S405). The CPU 141 starts the image forming operation at the second image forming speed V2 (Step S406). The CPU 141 controls the drive motor 206, which is configured to rotate the rotary polygon mirror 205, so that the photosensitive drums 101 are scanned with light beams at a scanning speed SV2 corresponding to the second image forming speed V2. The scanning speed SV of light beams with which the photosensitive drums 101 are scanned is in proportion to the image forming speed V. The ratio of the scanning speed SV2, which corresponds to the second image forming speed V2, to the scanning speed SV1, which corresponds to the first image forming speed V1, (SV2/SV1) is accordingly equal to the speed ratio of the second image forming speed V2 to the first image forming speed V1 (V2/V1). The rotation speed of the photosensitive drums 101 and the conveying speed of the bearing member belt 105 are in proportion to the image forming speed V as in the case of the scanning speed SV. The CPU 141 then forms the registration correction patterns 501 on the bearing member belt 105 in the manner described above (Step S407). The pattern shape of the registration correction patterns 501 at the second image forming speed V2 can be the same as the pattern shape at the first image forming speed V1.

The CPU 141 detects the registration correction patterns 501 with the use of the pattern sensors 500 (Step S408). The CPU 141 calculates the main scanning misregistration amount for each color from the detection timing of the registration correction patterns 501, and stores the calculated misregistration amounts in the storage portion 140 (Step S409). The main scanning misregistration amounts (distances) of magenta (M), cyan (C), and black (K) with respect to yellow (Y) at the second image forming speed V2 are denoted by Δym2, Δyc2, and Δyk2, respectively. The misregistration amount Δym2 is substantially 0, and Δyc2 and Δyk2 have substantially the same value.

The CPU 141 calculates the correction amount ΔBD from the main scanning registration amounts Δym1, Δyc1, and Δyk1 at the first image forming speed V1 and from the main scanning registration amounts Δym2, Δyc2, and Δyk2 at the second image forming speed V2, and stores the calculated correction amount ΔBD in the storage portion 140 (Step S410). The correction amount ΔBD is calculated based on the half value of each of the main scanning misregistration amounts Δym1, Δyc1, Δyk1, Δym2, Δyc2, and Δyk2. The correction amounts ΔBD of the colors other than yellow (Y), which is the reference color, are described below.

Correction amounts ΔBD12 used when images are formed at the second image forming speed V2 are expressed by expressions given below. The second scanning speed SV2 is a scanning speed at which the photosensitive drums 101 are scanned with light beams at the second image forming speed V2.

$$\Delta BD12_{ym} = \frac{\Delta ym1 - \Delta ym2}{2} \times \frac{1}{SV2}$$

$$\Delta BD12_{yc} = \frac{\Delta yc1 - \Delta yc2}{2} \times \frac{1}{SV2}$$

$$\Delta BD12_{yk} = \frac{\Delta yk1 - \Delta yk2}{2} \times \frac{1}{SV2}$$

The main scanning registration image forming speed correction mode may be executed once after assembly at the factory to store the correction amount ΔBD in the storage portion 140 in advance, or may be executed each time image forming is performed on a given number of sheets to store the correction amount ΔBD in the storage portion 140 each time. The image forming speed V in the first embodiment is not limited to two speeds. The image forming speed V may have three or more speeds. When there are three or more options for the image forming speed V, the main scanning misregistration amounts are calculated at each speed and are stored in the storage portion 140. For each speed, the correction amount ΔBD to be used when images are formed at the speed is calculated and stored in the storage portion 140.

(Registration Correction Mode)

The registration correction mode is described next. The image forming apparatus 100 can operate in the registration correction mode under a given condition, before the image forming operation is started. The given condition is, for example, the length of time elapsed since the last execution of the registration correction mode, or the number of sheets on which image forming is performed. The CPU 141 executes control operation in the registration correction mode as programmed by a program that is stored in the storage portion 140. The registration correction mode is executed in order to correct color misregistration in the main scanning direction and color misregistration in the sub-scanning direction.

In the case where the registration correction mode is started before the start of the image forming operation, the CPU 141 forms the registration correction patterns 501 as those illustrated in FIG. 10 on the bearing member belt 105. The CPU 141 detects the positions of the registration correction patterns 501 with the use of the pattern sensors 500 as illustrated in FIG. 11. The CPU 141 determines a registration correction value based on the result of the detection by the pattern sensors 500. The CPU (writing start timing determination unit) 141 determines, as a registration correction value, the first image writing start timing BPS for starting the writing of an image at a constant position in the main scanning direction for each color. The registration correction mode can be executed at the first image forming speed V1 and the second image forming speed V2. In the first embodiment, the registration correction mode is executed at the first image forming speed V1 before the image forming operation is started. Specifically, the CPU 141 determines the writing start timing BPS1 at the first image forming speed V1 before the image forming operation is started. The CPU 141 stores the determined writing start timing BPS1 in the storage portion 140 as a registration correction value, and stores the first image forming speed V1 in the storage portion 140 as an image forming speed used when the writing start timing BPS1 is determined. The image forming apparatus 100, which operates in the registration correction mode before the start of the image forming operation in the first embodiment, may operate in the registration correction mode each time image forming is performed on a given number of sheets.

(Control Operation in Image Forming)

Figure 12:
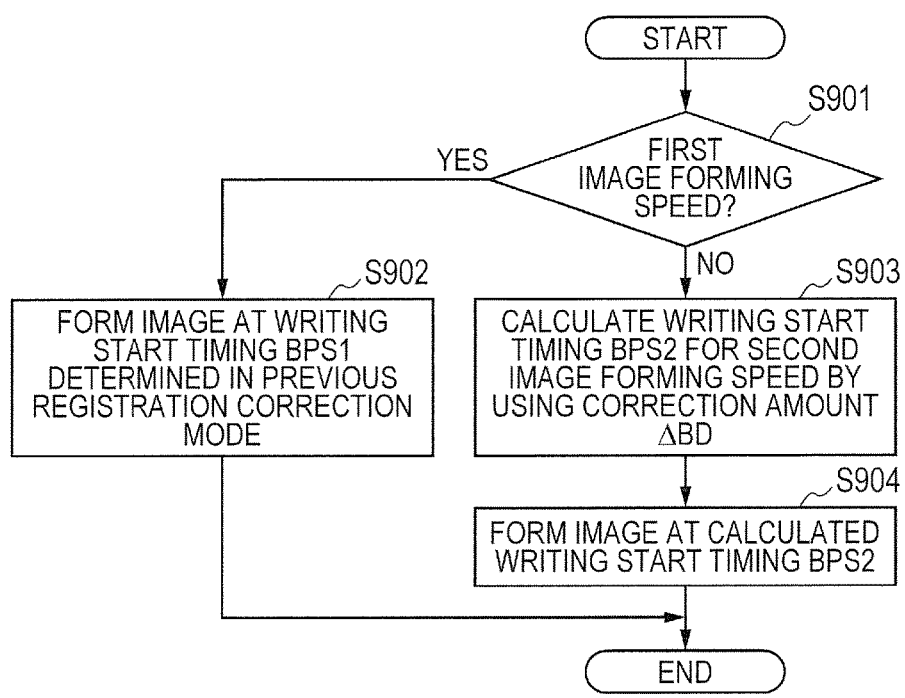
FIG. 12 is a flowchart of an image forming control operation executed by a CPU.

Control operation in image forming is described next. FIG. 12 is a flowchart of an image forming control operation executed by the CPU 141. The image forming apparatus 100 in the first embodiment can operate at the first image forming speed V1 and the second image forming speed V2. The image forming apparatus 100 operates in the registration correction mode at the first image forming speed V1 before the image forming operation is started. The CPU 141 executes the image forming control operation as programmed by a program that is stored in the storage portion 140. When the image forming control operation is started, the CPU 141 determines whether or not the image forming speed that is currently set is the first image forming speed V1 (Step S901). When the currently set image forming speed is the first image forming speed V1 ("YES" in Step S901), the CPU 141 forms images based on the writing start timing BPS1 that is determined in the previous registration correction mode (Step S902). When the currently set image forming speed is not the first image forming speed V1 ("NO" in Step S901), on the other hand, the CPU 141 calculates the writing start timing BPS2 in the main scanning directions at the second image forming speed V2 in a manner described below (Step S903). The calculation uses the writing start timing BPS1 that is determined in the registration correction mode executed at the first image forming speed V1, the speed ratio SV1/SV2, which is the ratio of the first scanning speed SV1 to the second scanning speed SV2, and the correction amounts ΔBD12, which are used when images are formed at the second image forming speed V2. Writing start timing BDS2y, writing start timing BDS2m, writing start timing BDS2c, and writing start timing BDS2k of the respective colors in the main scanning directions are expressed as follows.

$$BDS2y = BDS1y \times \frac{SV1}{SV2} + \frac{(\Delta BD12yc + \Delta BD12yk)}{2}$$

$$BDS2m = BDS1m \times \frac{SV1}{SV2} + \frac{(\Delta BD12yc + \Delta BD12yk)}{2} + \Delta BD12ym$$

$$BDS2c = BDS1c \times \frac{SV1}{SV2} + \Delta BD12yc$$

$$BDS2k = BDS1k \times \frac{SV1}{SV2} + \Delta BD12yk$$

The CPU 141 uses the calculated writing start timing BPS2 to form images at the second image forming speed V2 (Step S904). With the writing start timing BDS2 corrected by the correction amounts ΔBD12, the color misregistration amount is reduced. The CPU 141 then ends the image forming control operation.

According to the first embodiment, images are formed at the writing start timing BDS1 that is determined in the previous registration correction mode, when the first image forming speed V1 is used. In the case where the first image forming speed V1 is switched to the second image forming speed V2, images are formed at the writing start timing BDS2 that is calculated from the correction amounts ΔBD12, without executing the registration correction mode. The image forming apparatus 100 according to the first embodiment can therefore prevent image misregistration when the image forming speed is switched, while shortening the length of time in which image forming is stopped (downtime).

In the first embodiment, the main scanning misregistration amount is actually measured for each image forming apparatus 100 by operating the image forming apparatus 100 in the main scanning registration image forming speed correction mode, and the correction amount ΔBD is calculated from the measured main scanning misregistration amount. This is because the correction amount ΔBD generally varies from one image forming apparatus 100 to another due to fluctuations among the buffer ICs 301 and 303, BDs 214, or other parts of any two image forming apparatus 100. However, a design value of the correction amount ΔBD can be used without measuring the correction amount ΔBD for each image forming apparatus 100, in the case where the signal transmission path is relatively short and simple, in the case where fluctuations in signal transmission delay are small, or in the case of inexpensive image forming apparatus in which fluctuations in signal transmission delay may be tolerated. The correction amounts ΔBD that are design nominal values (ΔBDy, ΔBDm, ΔBDc, and ΔBDk) may be stored in the storage portion 140 of the image forming apparatus 100 as fixed values (standard values).

The image forming apparatus 100 in the first embodiment can operate at the first image forming speed V1 and the second image forming speed V2. The image forming apparatus 100 operates in the registration correction mode at the first image forming speed V1 before the image forming operation is started, and determines the writing start timing BPS1 at the first image forming speed V1. In the case where the image forming apparatus 100 forms images at the second image forming speed V2, the writing start timing BPS2 in the main scanning direction is determined in a manner described below. The calculation uses the correction amounts ΔBD12y, ΔBD12m, ΔBD12c, and ΔBD12k that are nominal values for yellow, magenta, cyan, and black images formed at the second image forming speed V2. The calculation uses the writing start timing BPS1 that is determined in the registration correction mode executed at the first image forming speed V1, and the speed ratio SV1/SV2, which is the ratio of the first scanning speed SV1 to the second scanning speed SV2. Writing start timing BDS2y, writing start timing BDS2m, writing start timing BDS2c, and writing start timing BDS2k of the respective colors in the main scanning directions are expressed as follows.

$$BDS2y = BDS1y \times \frac{SV1}{SV2} + \Delta BD12y$$

$$BDS2m = BDS1m \times \frac{SV1}{SV2} + \Delta BD12m$$

$$BDS2c = BDS1c \times \frac{SV1}{SV2} + \Delta BD12c$$

$$BDS2k = BDS1k \times \frac{SV1}{SV2} + \Delta BD12k$$

In accordance with the flowchart of FIG. 12, the writing start timing BDS2 at the second image forming speed V2 is calculated from the correction amounts ΔBD12 that are nominal values and from the writing start timing BDS1 determined in the registration correction mode, to thereby form images. According to the first embodiment, color misregistration is thus reduced by correcting the writing start timing even when the image forming speed of the image forming apparatus 100 is switched.

Second Embodiment

A second embodiment will be described below. In the second embodiment, the same structure as the one in the first embodiment is denoted by the same reference symbol and a description thereof is omitted. The image forming apparatus 100 and the light scanning device 200 in the second embodiment are the same as the image forming apparatus 100 and the light scanning device 200 in the first embodiment, and descriptions thereof are not repeated here.

Figure 13:
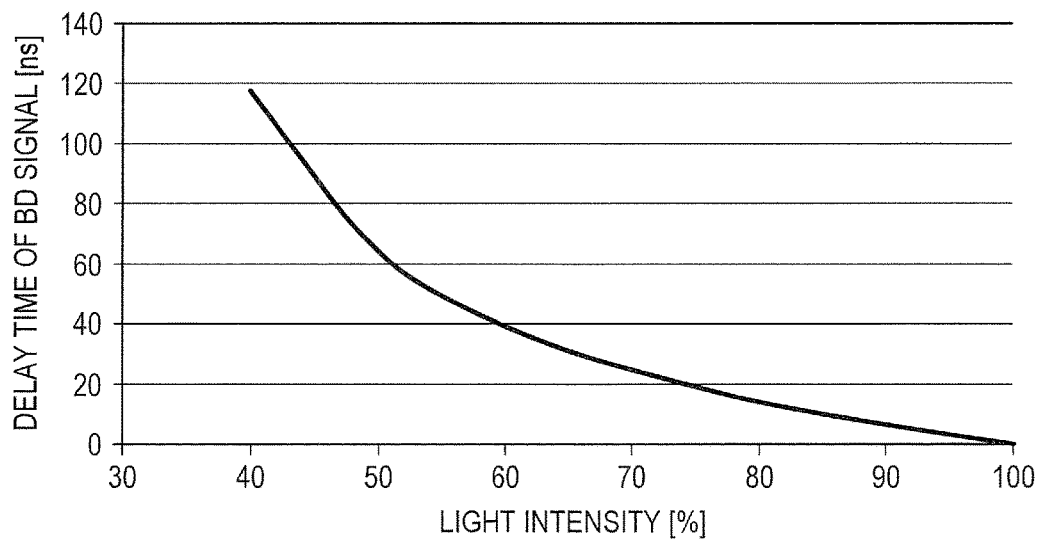
FIG. 13 is a graph for showing changes in the delay time of the BD signal in relation to changes in the light intensity of a light beam.

A change in the light intensity of a light beam necessary to form an image changes timing at which a BD signal is output from a BD. This is because the length of time required for photoelectric conversion varies depending on the light intensity of a light beam that enters the BD. FIG. 13 is a graph for showing changes in the delay time of a BD signal in relation to changes in the light intensity of a light beam. The axis of abscissa represents the light intensity (%) of a light beam. The axis of ordinate represents the delay time of a BD signal output from a BD that receives a light beam having a light intensity of 100%, with the output timing of the BD signal as a reference. The delay time of the BD signal indicates the length of time (in nanoseconds) by which writing start timing is shortened when writing start timing at a light intensity of 100% is used as a reference time. The reference time is the length of time from when the BD receives a light beam having a light intensity of 100% and outputs the BD signal till when a point at an image height of 0 mm is exposed to the light beam (the length of time till writing start timing is reached). The delay time is the difference between the reference time and the length of time from when the BD receives a light beam having a certain light intensity and outputs a BD signal till when the point at an image height of 0 mm is exposed to this light beam. In short, the delay time can be expressed as the length of time by which the reference time is shortened. The point at an image height of 0 mm is a point along the optical axis in a main scanning direction. Specifically, the point at an image height of 0 mm is the center point of an image in the main scanning direction. The length of time from when the BD receives a light beam and outputs a BD signal till when the point at an image height of 0 mm is exposed to the light beam (the length of time till writing start timing is reached) becomes generally shorter as the light intensity becomes lower. In other words, the delay time of the BD signal becomes longer as the light intensity becomes lower. This is because the delay amount of the photoelectric conversion time becomes larger as the light intensity of a light beam becomes lower. It is therefore necessary to take into account color misregistration due to a change in the light intensity of a light beam in addition to color misregistration due to the delay time of a delay in signal transmission that is caused when the image forming speed is changed.

In view of the above, the image forming apparatus 100 according to the second embodiment prevents image misregistration due to a change in the light intensity of a light beam while shortening the length of time in which image forming is stopped as a result of switching the image forming speed.

(Image Density Correction Mode)

A change in the image forming speed of the image forming apparatus 100, or a change in the environment surrounding the image forming apparatus 100, changes the light intensity of a light beam for forming an image at an appropriate density. The image forming apparatus 100 adjusts the light intensity of the light beam in order to give an appropriate density to an image to be output. The image forming apparatus 100 can operate in an image density correction mode, which involves forming a plurality of toner images by changing the light intensity of the light beam to a plurality of values, measuring the density of each toner image, and adjusting the light intensity of the light beam based on the result of the measurement. The image forming apparatus 100 operates in the image density correction mode each time image forming is performed on a given number of sheets, or when the surrounding environment changes. The light beam intensity is also adjusted as one of image forming conditions in some cases when the image forming speed is changed.

Figure 14:
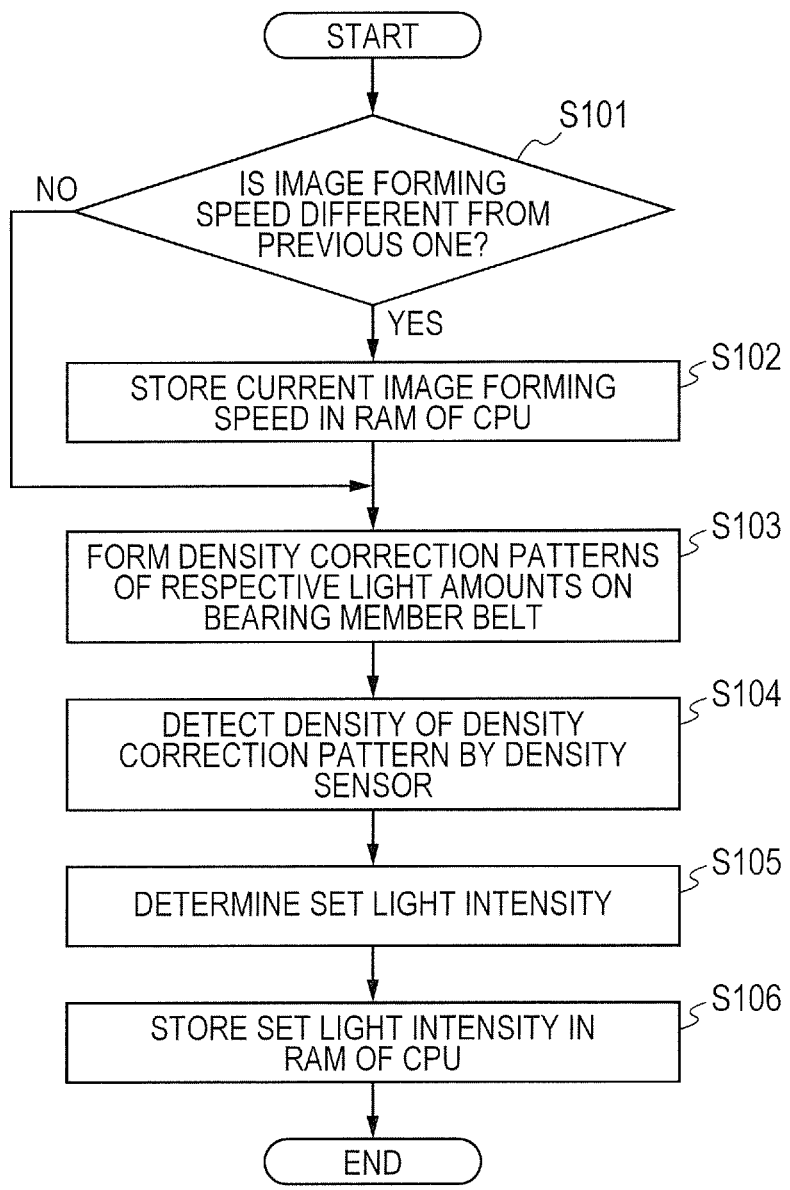
FIG. 14 is a flowchart of control operation in an image density correction mode.
Figure 15:
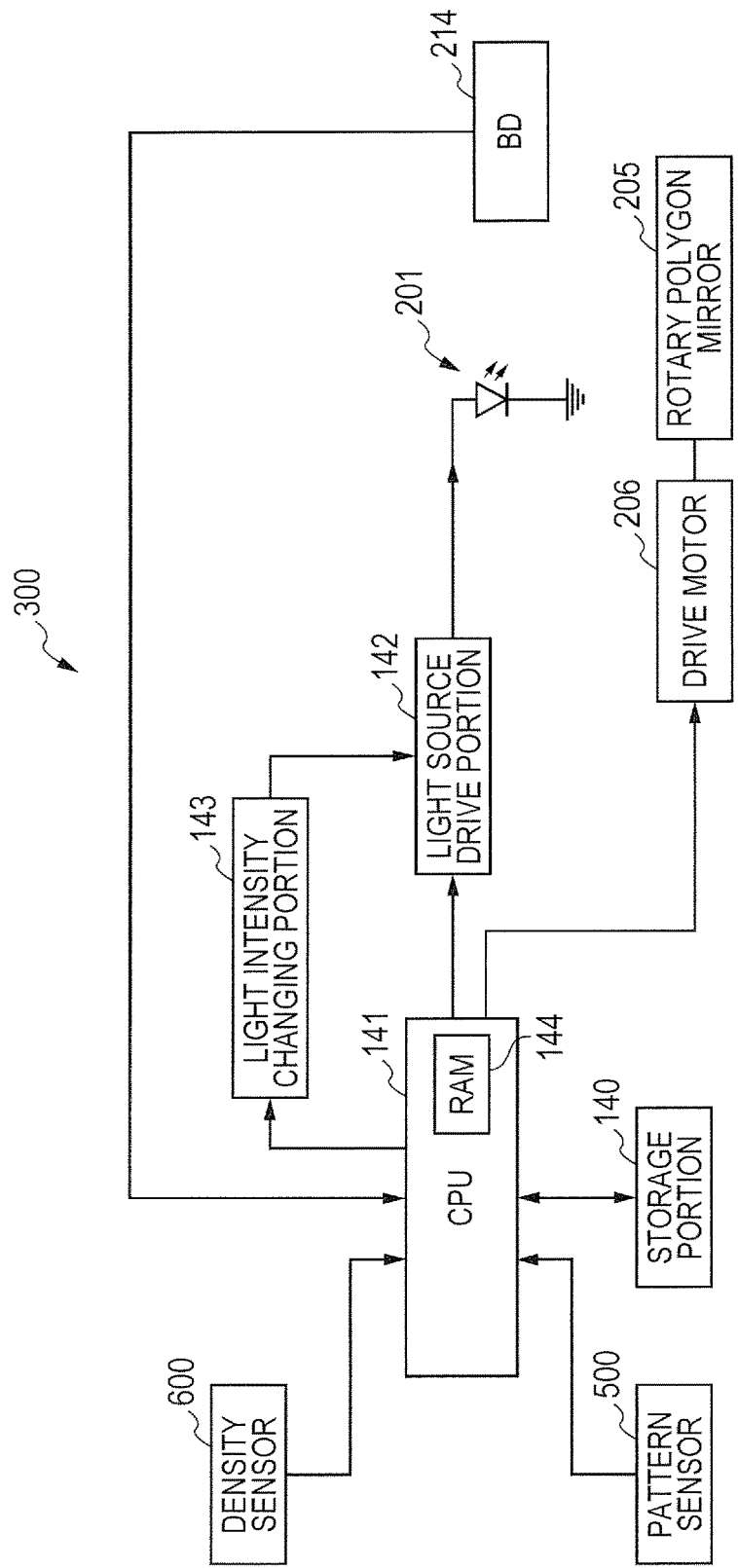
FIG. 15 is a block diagram of another control system.
Figure 16:
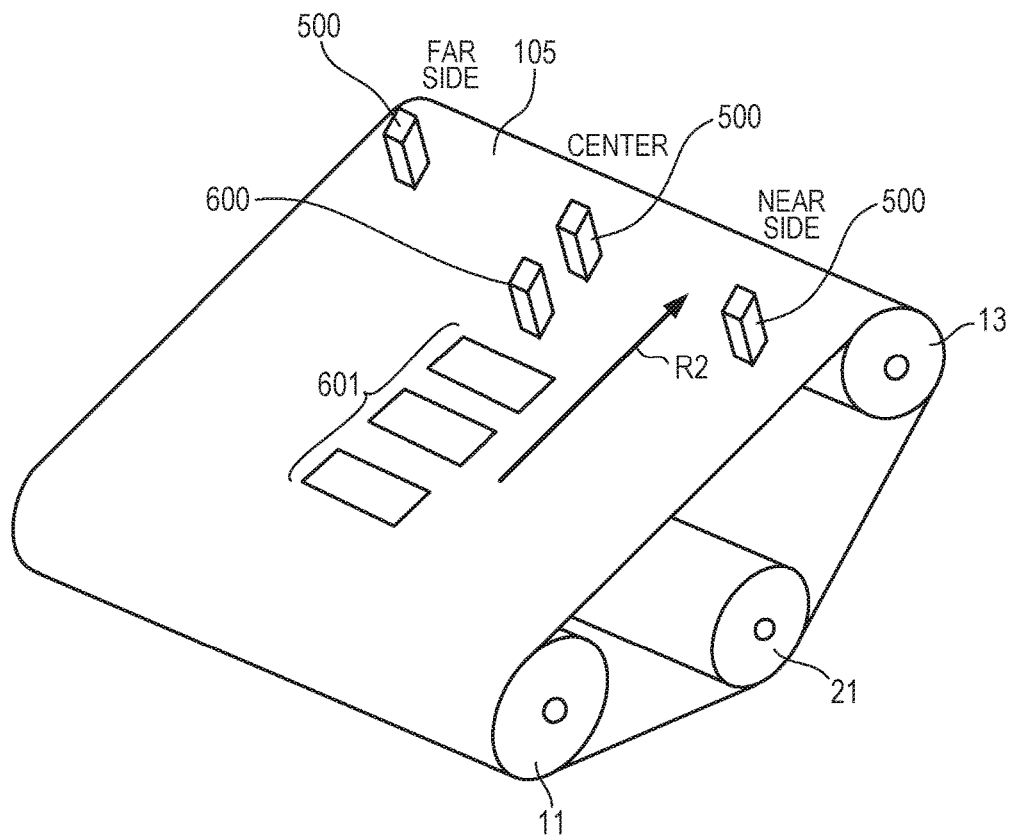
FIG. 16 is a diagram for illustrating density correction patterns that are formed on the bearing member belt, and a density sensor.
Figure 17:
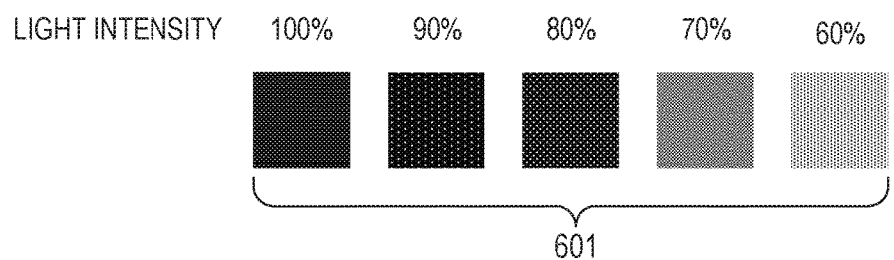
FIG. 17 is a diagram for illustrating the density correction patterns.
Figure 18:
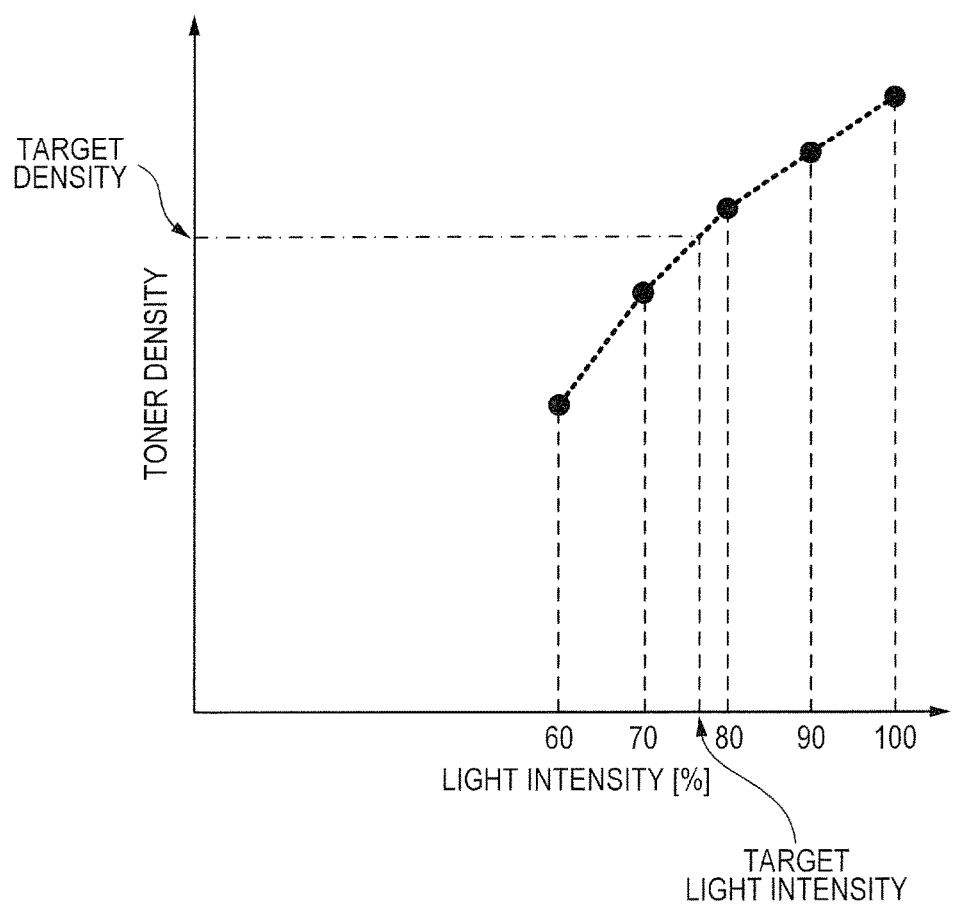
FIG. 18 is a graph for showing a relation between the light intensity and the toner density.

The image density correction mode will be described below with reference to FIG. 14, FIG. 15, FIG. 16, FIG. 17, and FIG. 18. FIG. 14 is a flowchart of control operation in the image density correction mode. FIG. 15 is a block diagram of the control system 300. FIG. 16 is a diagram for illustrating density correction patterns 601 that are formed on the bearing member belt, and a density sensor 600. FIG. 17 is a diagram for illustrating the density correction patterns 601. FIG. 18 is a graph for showing a relation between the light intensity and the toner density.

The control system 300 includes, as illustrated in FIG. 15, the CPU 141, the light sources 201, the light source drive portions 142, a light intensity changing portion 143, the density sensor 600, the storage portion 140, the pattern sensors 500, the drive motor 206, the rotary polygon mirror 205, and the BD 214. The CPU 141 executes control operation in the image density correction mode as programmed by a program that is stored in the storage portion 140 serving as a storage unit. It is preferred that the storage portion 140 include a ROM on which programs are stored and a RAM on which detected data and calculated data are stored. The operation of the image forming apparatus 100 in the image density correction mode is started by the operation portion (not shown) or the CPU 141.

Referring to FIG. 14, when the control operation in the image density correction mode is started, the CPU 141 determines whether or not the image forming speed in the current image density correction mode differs from the image forming speed in the previous image density correction mode (Step S101). When the current image forming speed differs from the previous image forming speed ("YES" in Step S101), the CPU 141 stores the current image forming speed in a RAM 144 of the CPU 141 (Step S102). The processing proceeds to Step S103. When the current image forming speed is the same as the previous image forming speed ("NO" in Step S101), on the other hand, the processing proceeds to Step S103.

The CPU 141 forms the density correction patterns 601 on the bearing member belt 105 for each light intensity determined in advance (Step S103). The CPU 141 forms the plurality of density correction patterns 601 on the bearing member belt 105 so that the density correction patterns 601 pass by the density sensor 600 as illustrated in FIG. 16. The CPU 141 varies the intensity of a light beam for each density correction pattern 601 to form the density correction patterns 601 at a light intensity of 100%, 90%, 80%, 70%, and 60% as illustrated in FIG. 17. While the density correction patterns 601 in the second embodiment are formed at a light intensity of 100%, 90%, 80%, 70%, and 60%, the light intensity of density correction patterns is not limited thereto. It is preferred that the light intensity of density correction patterns be determined from the light intensity range that is used and from the precision of calculation in the case where an appropriate light intensity is calculated by linear interpolation or the like. The CPU 141 sets a plurality of light intensity values to the light intensity changing portion 143 of FIG. 15 which serves as a light intensity changing unit, in order to vary the light intensity of a light beam. The light intensity changing portion 143 generates a pulse width modulated signal (PWM signal) having a duty ratio that is determined by the set light intensity value, in order to change the light intensity of a light beam emitted from a light source. The light intensity changing portion 143 outputs the generated PWM signal to the light source drive portions 142 serving as light source drive units. The light source drive portions 142 control the light intensity of light beams emitted from the light sources 201, based on the PWM signal having a duty ratio that is determined by the set light intensity value.

Another method may be employed in which the light intensity changing portion 143 is omitted. The CPU 141 in this case generates PWM signals having duty ratios that are determined by a plurality of given light intensity values, and the PWM signals are output from the CPU 141 directly to the light source drive portions 142. Alternatively, the CPU 141 may set a plurality of given light intensity values to the light source drive portions 142 in the case where the light source drive portions 142 can be digitally controlled. The light source drive portions 142 in this case control the light intensity of light beams output from the light sources 201, based on the given light intensity values.

The CPU 141 uses the density sensor 600 to detect the densities of the plurality of density correction patterns 601 formed at different light intensities on the bearing member belt 105 as illustrated in FIG. 16 (Step S104). The density sensor 600 may detect the density by, for example, irradiating the density correction patterns 601 with light from a light emitting diode (LED) or other light emission sources, receiving reflected light with a photodiode (PD) or other light receiving elements, and using the intensity of the reflected light for density detection. In this manner, the densities of the plurality of density correction patterns 601 formed at different light intensities are detected to find the density correction pattern 601 that has a density close to an appropriate density (target density) determined in advance, with the result that a light intensity at which the density is appropriate is obtained. For example, FIG. 18 is a graph of the light intensity and the toner density that is created based on the result of the detection. An increase in light intensity increases the toner density as shown in FIG. 18. It can be seen in the graph that the light intensity of light beams is to be set between 70% and 80% in order to adjust the density to an appropriate density (target density) determined in advance. The CPU 141 serving as a light intensity setting unit determines a set light intensity (target light intensity) necessary for the adjustment to the target density by linear interpolation of the light intensity between 70% and 80% (Step S105). The CPU 141 stores the determined set light intensity in the RAM 144 of the CPU 141 (Step S106). The CPU 141 then ends the control operation in the image density correction mode.

The CPU 141 determines the set light intensity for image forming through the control operation in the image density correction mode described above. In image forming executed after the completion of the image density correction mode, an image is formed at the set light intensity determined in the image density correction mode.

(Method of Calculating the Correction Amount ΔBD)

A method of calculating the correction amount ΔBD is described below. The correction amount ΔBD calculated here is used to correct main scanning position misregistration due to a BD detection delay time at the current light intensity and due to the circuit delay time Td. The calculation of the correction amount ΔBD is executed in a main scanning registration image forming speed correction mode. This main scanning registration image forming speed correction mode is different from a before-image formation registration correction mode that is executed at an image forming speed used in image forming before the start of the image forming operation. The image forming apparatus 100 is operated, after assembly, in the main scanning registration image forming speed correction mode at the factory. The image forming apparatus 100 may be operated in the main scanning registration image forming speed correction mode each time image forming is performed on a given number of sheets. The image forming apparatus 100 can operate in a before-image formation registration correction mode before the image forming operation is started, and can operate in an image-to-image interval registration correction mode during image forming. The before-image formation registration correction mode and the image-to-image interval registration correction mode are described later.

(Main Scanning Registration Image Forming Speed Correction Mode)

Figure 19:
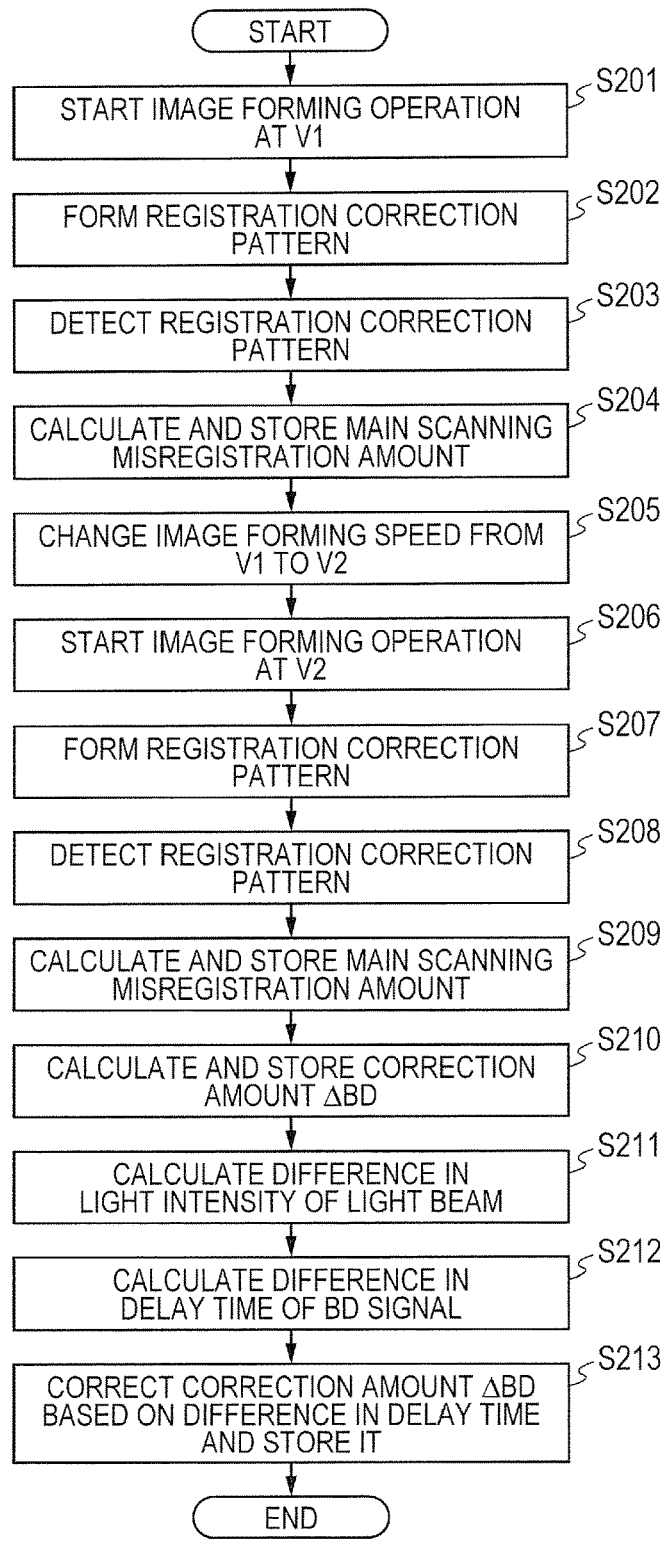
FIG. 19 is a flowchart of control operation in a main scanning registration image forming speed correction mode.

The main scanning registration image forming speed correction mode is described below with reference to FIG. 15, FIG. 19, FIG. 10, and FIG. 11. FIG. 19 is a flowchart of control operation in the main scanning registration image forming speed correction mode. The CPU 141 executes control operation in the main scanning registration image forming speed correction mode as programmed by a program that is stored in the storage portion 140 serving as the storage unit. The operation of the image forming apparatus 100 in the main scanning registration image forming speed correction mode is started by the operation portion (not shown) or the CPU 141. In the main scanning registration image forming speed correction mode, the registration correction patterns 501 are formed with light beams having a set light intensity LI0 that is determined in the image density correction mode.

When the control operation in the main scanning registration image forming speed correction mode is started, the CPU 141 starts the image forming operation at the first image forming speed V1 with the use of light beams having the set light intensity LI0 that is determined in the image density correction mode (Step S201). The CPU 141 stores the first image forming speed V1 and the set light intensity LI0 in the storage portion 140. The CPU 141 controls the drive motor 206, which is configured to rotate the rotary polygon mirror 205, so that the photosensitive drums 101 are scanned with light beams at a scanning speed SV1 corresponding to the first image forming speed V1. The CPU 141 uses the light beams to form electrostatic latent images on the surfaces of the photosensitive drums 101 in the registration correction patterns 501 illustrated in FIG. 10. The electrostatic latent images are developed with toners into toner images by the developing device 103. The toner images are transferred onto the bearing member belt 105 by the primary transfer device 104, and the registration correction patterns 501 are formed on the bearing member belt 105 (Step S202). The yellow, magenta, cyan, and black registration correction patterns 501Y, 501M, 501C, and 501K are formed in a plurality of sets in the rotation direction (conveying direction) R2 of the bearing member belt 105 which is the sub-scanning direction as illustrated in FIG. 11. The registration correction patterns 501 are arranged on the near side, at the center, and on the far side of the bearing member belt 105 as illustrated in FIG. 11. The pattern sensors 500 configured to detect the registration correction patterns 501 are arranged on the near side, at the center, and on the far side of the bearing member belt 105.

The registration correction patterns 501 are patterns formed of yellow toner, magenta toner, cyan toner, and black toner on the bearing member belt 105 in order to detect the amount of misregistration with respect to a predetermined reference color for the rest of the colors. The CPU 141 detects the registration correction patterns 501 with the use of the pattern sensors 500 (Step S203). The CPU 141 serving as a misregistration amount detection unit calculates the main scanning misregistration amount for each color from the detection timing of the registration correction patterns 501, and stores the calculated misregistration amounts in the storage portion 140 (Step S204). The reference color in the second embodiment is yellow (Y). The main scanning misregistration amounts (distances) of magenta (M), cyan (C), and black (K) with respect to yellow (Y) at the first image forming speed V1 are denoted by $\Delta ym1$, $\Delta yc1$, and $\Delta yk1$, respectively. In the case of the four-color and opposed-scanning-type light scanning device 200 of the second embodiment which are illustrated in FIGS. 2A, 2B and 2C, $\Delta ym1$ is substantially 0, and $\Delta yc1$ and $\Delta yk1$ have substantially the same value.

The CPU 141 next changes the image forming speed from the first image forming speed V1 to the second image forming speed V2 (Step S205). The CPU 141 starts the image forming operation at the second image forming speed V2 with the light beams having the same set light intensity LI0 as in the case of the first image forming speed V1 (Step S206). The CPU 141 stores the second image forming speed V2 and the set light intensity LI0 in the storage portion 140. The CPU 141 controls the drive motor 206, which is configured to rotate the rotary polygon mirror 205, so that the photosensitive drums 101 are scanned with light beams at a scanning speed SV2 corresponding to the second image forming speed V2. The scanning speed SV of light beams with which the photosensitive drums 101 are scanned is in proportion to the image forming speed V. The ratio of the scanning speed SV2 to the scanning speed SV1 (SV2/SV1) is accordingly equal to the speed ratio of the second image forming speed V2 to the first image forming speed V1 (V2/V1). The rotation speed of the photosensitive drums 101 and the conveying speed of the bearing member belt 105 are in proportion to the image forming speed V as in the case of the scanning speed SV. The CPU 141 then forms the registration correction patterns 501 on the bearing member belt 105 in the manner described above (Step S207). The pattern shape of the registration correction patterns 501 at the second image forming speed V2 can be the same as the pattern shape at the first image forming speed V1.

The CPU 141 detects the registration correction patterns 501 with the use of the pattern sensors 500 (Step S208). The CPU 141 calculates the main scanning misregistration amount for each color from the detection timing of the registration correction patterns 501, and stores the calculated misregistration amounts in the storage portion 140 (Step S209). The main scanning misregistration amounts (distances) of magenta (M), cyan (C), and black (K) with respect to yellow (Y) at the second image forming speed V2 are denoted by $\Delta ym2$, $\Delta yc2$, and $\Delta yk2$, respectively. The misregistration amount $\Delta ym2$ is substantially 0, and $\Delta yc2$ and $\Delta yk2$ have substantially the same value.

The CPU 141 calculates the correction amount $\Delta BD$ from the main scanning registration amounts $\Delta ym1$, $\Delta yc1$, and $\Delta yk1$ at the first image forming speed V1 and from the main scanning registration amounts $\Delta ym2$, $\Delta yc2$, and $\Delta yk2$ at the second image forming speed V2, and stores the calculated correction amount $\Delta BD$ in the storage portion 140 (Step S210). The correction amount $\Delta BD$ is calculated based on the half value of each of the main scanning misregistration amounts $\Delta ym1$, $\Delta yc1$, $\Delta yk1$, $\Delta ym2$, $\Delta yc2$, and $\Delta yk2$. The correction amounts $\Delta BD$ of the colors other than yellow (Y), which is the reference color, in the case where the light intensity of light beams is not changed are described below.

The correction amounts $\Delta BD12$ are expressed by expressions given below in the case where images are formed at the second image forming speed V2 without changing the light intensity of the light beams after the color misregistration amounts in the main scanning directions are corrected at the first image forming speed V1 in the before-image formation registration correction mode, which is described later. The second scanning speed SV2 is a scanning speed at which the photosensitive drums 101 are scanned with light beams at the second image forming speed V2.

$$\Delta BD12_{ym} = \frac{\Delta ym1 - \Delta ym2}{2} \times \frac{1}{SV2}$$

$$\Delta BD12_{yc} = \frac{\Delta yc1 - \Delta yc2}{2} \times \frac{1}{SV2}$$

$$\Delta BD12_{yk} = \frac{\Delta yk1 - \Delta yk2}{2} \times \frac{1}{SV2}$$

The correction amounts $\Delta BD21$ are expressed by expressions given below in the case where images are formed at the first image forming speed V1 without changing the light intensity of the light beams after the color misregistration amounts in the main scanning directions are corrected at the second image forming speed V2 in the before-image formation registration correction mode, which is described later. The first scanning speed SV1 is a scanning speed at which the photosensitive drums 101 are scanned with light beams at the first image forming speed V1.

$$\Delta BD21_{ym} = \frac{\Delta ym2 - \Delta ym1}{2} \times \frac{1}{SV1}$$

$$\Delta BD21_{yc} = \frac{\Delta yc2 - \Delta yc1}{2} \times \frac{1}{SV1}$$

$$\Delta BD21_{yk} = \frac{\Delta yk2 - \Delta yk1}{2} \times \frac{1}{SV1}$$

The correction amounts $\Delta BD12$ and the correction amount $\Delta BD21$ that are used when the light intensity of the light beams is not changed are values unique to the image forming apparatus 100. In the case where the scanning speed of the light beams is changed, however, the light intensity of the light beams needs to be changed in order to keep the image density constant. The light beams are scanned over the surfaces of the photosensitive drums 101, which rotate in the sub-scanning direction, while being repeatedly scanned in the main scanning directions. This means that, when the photosensitive drums 101 are exposed to light beams of the same light intensity, the light intensity per unit area of the surfaces of the photosensitive drums 101 changes with a change in image forming speed. Consequently, the image density changes with a change in image forming speed when the light intensity of the light beams is constant. The light intensity of the light beams therefore needs to be adjusted in accordance with the change in image forming speed in order to keep the image density constant. When the light intensity of the light beams is adjusted, the delay time of the BD signal output from the BD 214 is changed as described above. Color misregistration due to a change in delay time can be corrected by executing registration correction after the light intensity of the light beams is adjusted. However, the correction amounts ΔBD described above need to be corrected based on the difference in light intensity in the case where the image forming speed is changed and the light intensity of the light beams is accordingly changed after registration correction.

In many cases, the timing to execute the before-image formation registration correction mode and the image-to-image interval registration correction mode, which are described later, is not the same as the timing to execute the image density correction mode. When the registration correction modes and the image density correction mode are executed at the same timing, finishing the correction modes takes long and the time till the image forming apparatus 100 returns to printing operation is prolonged. For that reason, the image density correction mode is executed at different timing from the execution timing of the registration correction modes in many cases. When the set light intensity of light beams used to form an image is changed in the image density correction mode after the registration correction modes are executed, the delay time of the BD signal output from the BD 214 changes as shown in FIG. 13, thereby causing a shift in writing start position. The method described below therefore corrects the correction amounts ΔBD described above that are used when the light intensity of the light beams is not changed, based on the difference in the delay time of the BD signal that is created by a change in the light intensity of the light beams.

Figure 20:
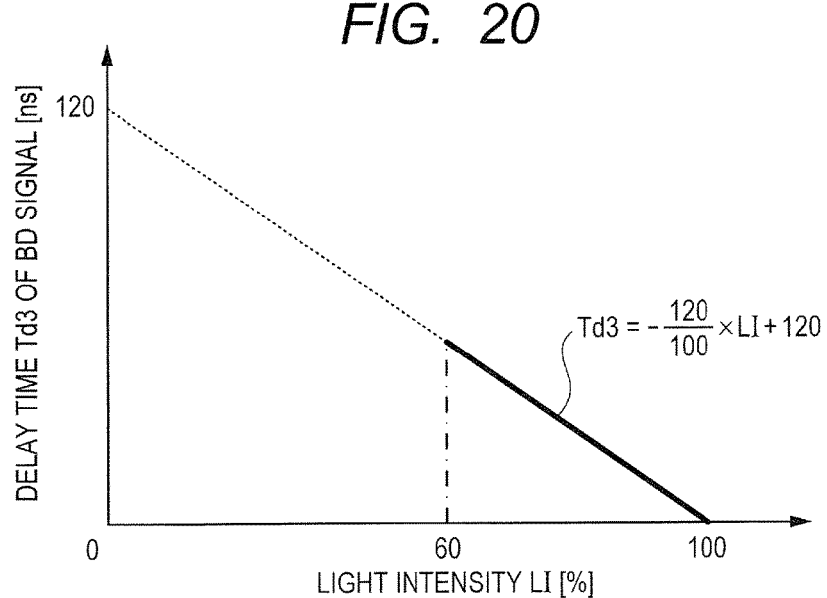
FIG. 20 is a graph for showing a relation between the light intensity of a light beam and the delay time of the BD signal that is approximated by a linear function.

In order to simplify changes in the delay time of the BD signal that are shown in FIG. 13 in relation to changes in the light intensity of the light beams, the relation between the light intensity and the delay time is approximated by a linear function. FIG. 20 is a graph for showing a relation between a light intensity LI of the light beams and a delay time Td3 of the BD signal that is approximated by a linear function. The axis of abscissa represents the light intensity LI (%) of the light beams. The axis of ordinate represents the delay time Td3 ($ns$) of the BD signal with main timing at a light intensity of 100% as a reference. Image misregistration due to the delay time Td3 of the BD signal is described below on the premise that the light intensity LI of the light beams and the delay time Td3 of the BD signal has a relation that is expressed by a linear function given below.

$$Td3 = -120/100 \times LI + 120$$

In the second embodiment, the light beam 220$k$ emitted from the light source 201K to form a black image enters the BD 214, thereby causing the BD 214 to generate the BD signal. The magnitude of the difference in the delay time of the BD signal is accordingly in relation to the magnitude of the difference in the light intensity of the light beam 220K for black that enters the BD 214. The CPU 141 therefore calculates the difference between a light intensity LI1$k$ of the light beam 220K for black at the first image forming speed V1 and a light intensity LI2$k$ of the light beam 220K for black at the second image forming speed V2 (Step S211). The CPU 141 calculates a difference ΔTd3$k$ in the delay time of the BD signal based on the linear function relation between the light intensity LI and the delay time Td3, and on the difference in light intensity (Step S212). The CPU 141 corrects the correction amount ΔBD based on the delay time difference ΔTd3$k$, and stores the corrected correction amount ΔBD in the storage portion 140 (Step S213). The correction of the correction amount ΔBD based on the delay time difference ΔTd3$k$ is described below.

In the case where the first image forming speed V1 is switched to the second image forming speed V2, a difference ΔTd3$k$12 in the delay time of the BD signal that is based on the difference between the light intensity LI1$k$ of the light beam at the first image forming speed V1 and the light intensity LI2$k$ of the light beam at the second image forming speed V2 is expressed as follows.

$$\Delta Td3k12 = -120/100 \times (LI2k - LI1k)$$

Similarly, in the case where the second image forming speed V2 is switched to the first image forming speed V1, a difference ΔTd3$k$21 in the delay time of the BD signal that is based on the difference between the light intensity LI2$k$ and the light intensity LI1$k$ of the light beam is expressed as follows.

$$\Delta Td3k21 = -120/100 \times (LI1k - LI2k)$$

In the case where images are formed at the second image forming speed V2 after the color misregistration amounts in the main scanning directions are corrected at the first image forming speed V1 in the before-image formation registration correction mode, which is described later, the correction amounts ΔBD12 are corrected in a manner described below. The correction amounts ΔBD12 are corrected with the use of the difference ΔTd3$k$12 in the delay time of the BD signal that is created by a change in the light intensity of the light beam, and are expressed as follows.

$$\Delta BD12_{ym} = \frac{\Delta ym1 - \Delta ym2}{2} \times \frac{1}{SV2} + \Delta Td3k12$$

$$\Delta BD12_{yc} = \frac{\Delta yc1 - \Delta yc2}{2} \times \frac{1}{SV2} + \Delta Td3k12$$

$$\Delta BD12_{yk} = \frac{\Delta yk1 - \Delta yk2}{2} \times \frac{1}{SV2} + \Delta Td3k12$$

In the case where images are formed at the first image forming speed V1 after the color misregistration amounts in the main scanning directions are corrected at the second image forming speed V2 in the before-image formation registration correction mode, which is described later, the correction amounts ΔBD21 are corrected in a manner described below. The correction amounts ΔBD21 are corrected with the use of the difference ΔTd3$k$21 in the delay time of the BD signal that is created by a change in the light intensity of the light beam, and are expressed as follows.

$$\Delta BD21_{ym} = \frac{\Delta ym2 - \Delta ym1}{2} \times \frac{1}{SV1} + \Delta Td3k21$$

$$\Delta BD21_{yc} = \frac{\Delta yc2 - \Delta yc1}{2} \times \frac{1}{SV1} + \Delta Td3k21$$

$$\Delta BD21_{yk} = \frac{\Delta yk2 - \Delta yk1}{2} \times \frac{1}{SV1} + \Delta Td3k21$$

The differences ΔTd3$k$12 and ΔTd3$k$21 in the delay time of the BD signal that are created by a change in the light intensity of the light beam may be calculated from image misregistration amounts that are measured in advance at the factory by changing the light intensity of the light beam. The delay time differences ΔTd3$k$12 and ΔTd3$k$21 may instead be obtained from a relation between the light intensity and the delay time that is known in advance from measurements in an experiment.

In the second embodiment, the light beam 220K emitted from the light source 201K to form a black image enters the BD 214, the differences $\Delta Td3k12$ and $\Delta Td3k21$ in the delay time of the BD signal are thus obtained based on a change in the light intensity of the light beam 220K for black. In some light scanning devices, however, the light beam 220Y for yellow and the light beam 220K for black enter a BD 214Y and a BD 214K, respectively. In that case, a delay time difference $\Delta Td3y$ and the delay time difference $\Delta Td3k$ may be obtained based on a change in the light intensity of the light beam 220Y that enters the BD 214Y and a change in the light intensity of the light beam 220K that enters the BD 214K, respectively. In some other light scanning devices, the light beam 220Y for yellow, the light beam 220M for magenta, the light beam 220C for cyan, and the light beam 220K for black enter the BD 214Y, a BD 214M, a BD 214C, and the BD 214K, respectively. In that case, the delay time difference $\Delta Td3y$, a delay time difference $\Delta Td3m$, a delay time difference $\Delta Td3c$, and the delay time difference $\Delta Td3k$ may be obtained based on a change in the light intensity of the light beam 220Y that enters the BD 214Y, a change in the light intensity of the light beam 220M that enters the BD 214M, a change in the light intensity of the light beam 220C that enters the BD 214C, and a change in the light intensity of the light beam 220K that enters the BD 214K, respectively.

The main scanning registration image forming speed correction mode may be executed once after assembly at the factory to store the correction amount $\Delta BD$ in the storage portion 140, or may be executed each time image forming is performed on a given number of sheets to store the correction amount $\Delta BD$ in the storage portion 140 each time. The image forming speed V in the second embodiment is not limited to two speeds. The image forming speed V may have three or more speeds. When there are three or more options for the image forming speed V, the main scanning misregistration amounts are calculated at each speed, and are stored in the storage portion 140. For each speed, the correction amount $\Delta BD$ to be used when images are formed at the speed is calculated and stored in the storage portion 140.

(Before-Image Formation Registration Correction Mode)

The before-image formation registration correction mode is described next. The image forming apparatus 100 can operate in the before-image formation registration correction mode under a given condition, before the image forming operation is started. The given condition is, for example, the length of time elapsed since the last execution of the before-image formation registration correction mode, or the number of sheets on which image forming is performed. The CPU 141 executes control operation in the before-image formation registration correction mode as programmed by a program that is stored in the storage portion 140. The before-image formation registration correction mode is executed in order to correct color misregistration in the main scanning direction and color misregistration in the sub-scanning direction.

In the case where the before-image formation registration correction mode is started before the start of the image forming operation, the CPU 141 forms the registration correction patterns 501 as those illustrated in FIG. 10 on the bearing member belt 105. The CPU 141 detects the positions of the registration correction patterns 501 with the use of the pattern sensors 500 as illustrated in FIG. 11. The CPU 141 determines a registration correction value based on the result of the detection by the pattern sensors 500. The CPU (writing start timing determination unit) 141 determines, as a registration correction value, the first image writing start timing BPS for starting the writing of an image at a constant position in the main scanning direction for each color. The before-image formation registration correction mode can be executed at the first image forming speed V1 and the second image forming speed V2. In the second embodiment, the registration correction mode is executed at the first image forming speed V1 before the image forming operation is started. Specifically, the CPU 141 determines the writing start timing BPS1 at the first image forming speed V1 before the image forming operation is started. The CPU 141 stores the determined writing start timing BPS1 in the storage portion 140 as a registration correction value, and stores the first image forming speed V1 in the storage portion 140 as an image forming speed used when the writing start timing BPS1 is determined. The image forming apparatus 100, which operates in the before-image formation registration correction mode before the start of the image forming operation in the second embodiment, may operate in the before-image formation registration correction mode each time image forming is performed on a given number of sheets.

(Image-to-Image Interval Registration Correction Mode)

The image-to-image interval registration correction mode is described next. The image forming apparatus 100 can operate in the image-to-image interval registration correction mode during the image forming operation under a given condition. The given condition is the length of time elapsed since the image-to-image interval registration correction mode is executed last time, the number of sheets on which image forming is performed, or the length of time elapsed since the execution of the before-image formation registration correction mode. The image-to-image interval registration correction mode can be executed at the first image forming speed V1 and the second image forming speed V2. In the image-to-image interval registration correction mode, the main scanning misregistration amount can be detected during the image forming operation, without stopping the image forming operation. The image forming apparatus 100 can therefore operate in the image-to-image interval registration correction mode without stopping the image forming operation while executing a job that is large in volume. The CPU 141 executes control operation in the image-to-image interval registration correction mode as programmed by a program that is stored in the storage portion 140. The image-to-image interval registration correction mode is executed in order to correct color misregistration in the main scanning direction and color misregistration in the sub-scanning direction.

Figure 21:
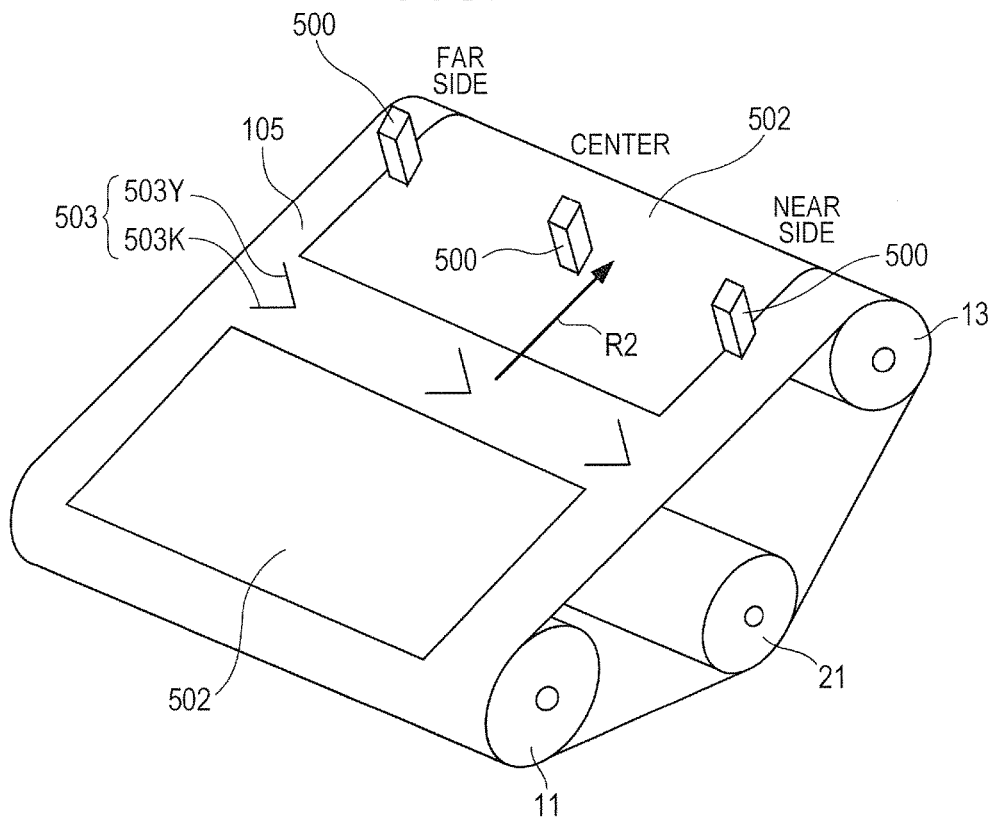
FIG. 21 is a diagram for illustrating image-to-image interval registration correction patterns that are formed on the bearing member belt.

FIG. 21 is a diagram for illustrating image-to-image interval registration correction patterns 503 that are formed on the bearing member belt 105. The image-to-image interval registration correction patterns 503 are combinations of a reference color pattern and a pattern for another color. For example, when a yellow pattern is used as the reference color pattern, the image-to-image interval registration correction patterns 503 are a combination of the yellow pattern and a magenta pattern, a combination of the yellow pattern and a cyan pattern, and a combination of the yellow pattern and a black pattern. The image-to-image interval registration correction patterns 503 that are illustrated in FIG. 21 are the combination of a yellow pattern 503Y and a black pattern 503K that is formed between one image 502 and another image 502 on the near side, at the center, and on the far side of the bearing member belt 105.

The image forming apparatus 100 operates in the image-to-image interval registration correction mode at the second image forming speed V2 to form the image-to-image interval registration correction patterns 503 between one image 502 and another image 502 during image forming as illustrated in FIG. 21. The gap between the one image 502 and the other image 502 (an image-to-image interval) is a few centimeters, and therefore not all of a registration correction pattern 501Y for yellow, a registration correction pattern 501M for magenta, a registration correction pattern 501C for cyan, and a registration correction pattern 501K for black are formed in a single image-to-image interval. The image-to-image interval registration correction patterns 503 that are a combination of the yellow pattern and the magenta pattern, the image-to-image interval registration correction patterns 503 that are a combination of the yellow pattern and the cyan pattern, and the image-to-image interval registration correction patterns 503 that are a combination of the yellow pattern and the black pattern are formed in separate image-to-image intervals in order. The image-to-image interval registration correction patterns 503 do not need to be formed in all image-to-image intervals, and are formed each time a predetermined number of sheets are printed in order to cut the amount of toner consumed. In the image-to-image interval registration correction mode, the first image writing start timing BPS for starting the writing of an image at a constant position in the main scanning direction is determined during the image forming operation, without stopping the image forming operation, and therefore does not lower the productivity.

Figure 22A:
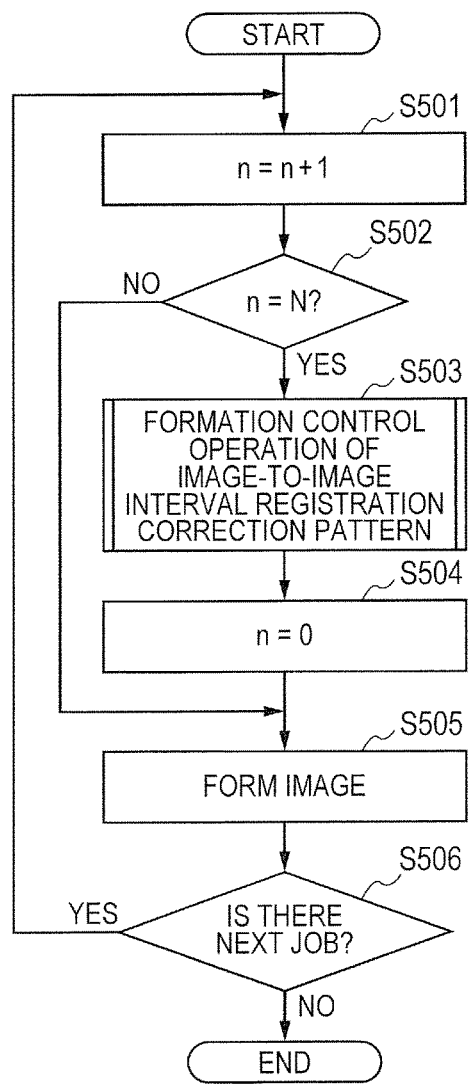
FIG. 22A and FIG. 22B are flowcharts of control operation in an image-to-image interval registration correction mode.
Figure 22B:
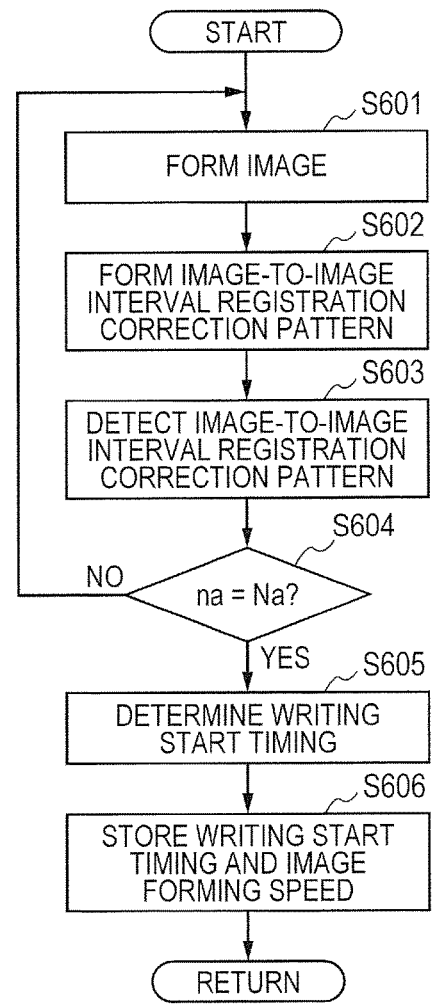

FIG. 22A and FIG. 22B are flowcharts of control operation in the image-to-image interval registration correction mode. The CPU 141 executes the control operation in the image-to-image interval registration correction mode as programmed by a program that is stored in the storage portion 140. The image forming operation of the image forming apparatus 100 is started by the CPU 141 in the image-to-image interval registration correction mode. Referring to FIG. 22A, when the image forming operation is started in the image-to-image interval registration correction mode, the CPU 141 adds 1 to an image-formed sheet count "n" stored in the storage portion 140 (Step S501). The CPU 141 determines whether or not the image-formed sheet count "n" has reached a given count N (Step S502). Control operation for forming the image-to-image interval registration correction patterns 503 is executed each time the number of sheets on which image forming is performed reaches the given count N. When the image-formed sheet count "n" has not reached the given count N ("NO" in Step S502), the CPU 141 forms an image (Step S505). When the image-formed sheet count "n" has reached the given count N ("YES" in Step S502), the CPU 141 executes the control operation for forming the image-to-image interval registration correction patterns 503 (Step S503).

In the control operation for forming the image-to-image interval registration correction patterns 503, the CPU 141 forms the image-to-image interval registration correction patterns 503 between one image 502 and another image 502 without stopping the image forming operation. FIG. 22B is a flowchart of a sub-routine of the control operation for forming the image-to-image interval registration correction patterns 503. When the control operation for forming the image-to-image interval registration correction patterns 503 is started, the CPU 141 forms an image (Step S601). The CPU 141 forms the image-to-image interval registration correction patterns 503 (Step S602). The CPU 141 uses the pattern sensors 500 to detect the positions of the image-to-image interval registration correction patterns 503 as illustrated in FIG. 21 (Step S603). The CPU 141 determines whether or not an image-formed sheet count "na" has reached a given count Na (Step S604). When the image-formed sheet count "na" has not reached the given count Na ("NO" in Step S604), the processing returns to Step S601, where an image is formed. The image-to-image interval registration correction patterns 503 are formed between images included in the given count Na.

When the image-formed sheet count "na" has reached the given count Na ("YES" in Step S604), the CPU 141 determines a registration correction value based on the result of the detection by the pattern sensors 500. The CPU 141 determines, as the registration correction value, the first image writing start timing BPS for starting the writing of an image at a constant position in the main scanning direction for each color (Step S605). The image-to-image interval registration correction mode in the second embodiment is executed at the first image forming speed V1 and the second image forming speed V2. For example, when the image-to-image interval registration correction mode is executed at the first image forming speed V1, the CPU 141 determines the writing start timing BPS1 at the first image forming speed V1 based on the result of the detection by the pattern sensors 500 (Step S605). The CPU 141 stores the determined writing start timing BPS1 in the storage portion 140 as a registration correction value, and stores the first image forming speed V1 in the storage portion 140 as an image forming speed that is used when the writing start timing BPS1 is determined (Step S606). When the image-to-image interval registration correction mode is executed at the second image forming speed V2, the CPU 141 determines the writing start timing BPS2 at the second image forming speed V2 based on the result of the detection by the pattern sensors 500 (Step S605). The CPU 141 stores the determined writing start timing BPS2 in the storage portion 140 as a registration correction value, and stores the second image forming speed V2 in the storage portion 140 as an image forming speed that is used when the writing start timing BPS2 is determined (Step S606). Once the registration correction value is determined, the CPU 141 ends the control operation for forming the image-to-image interval registration correction patterns 503, and returns to the flowchart of FIG. 22A.

The CPU 141 sets the image-formed sheet count "n" to 0 (zero) (Step S504). The CPU 141 forms an image (Step S505). The CPU 141 determines whether or not there is an image forming job to be executed next (Step S506). When there is an image forming job to be executed next ("YES" in Step S506), the processing returns to Step S501, where the image forming operation is continued. When there is no image forming job to be executed next ("NO" in Step S506), the CPU 141 ends the image forming operation in the image-to-image interval registration correction mode. The image-to-image interval registration correction mode is thus executed periodically each time the number of sheets on which image forming is performed reaches the given count N.

(Image Forming Control Operation)

Figure 23:
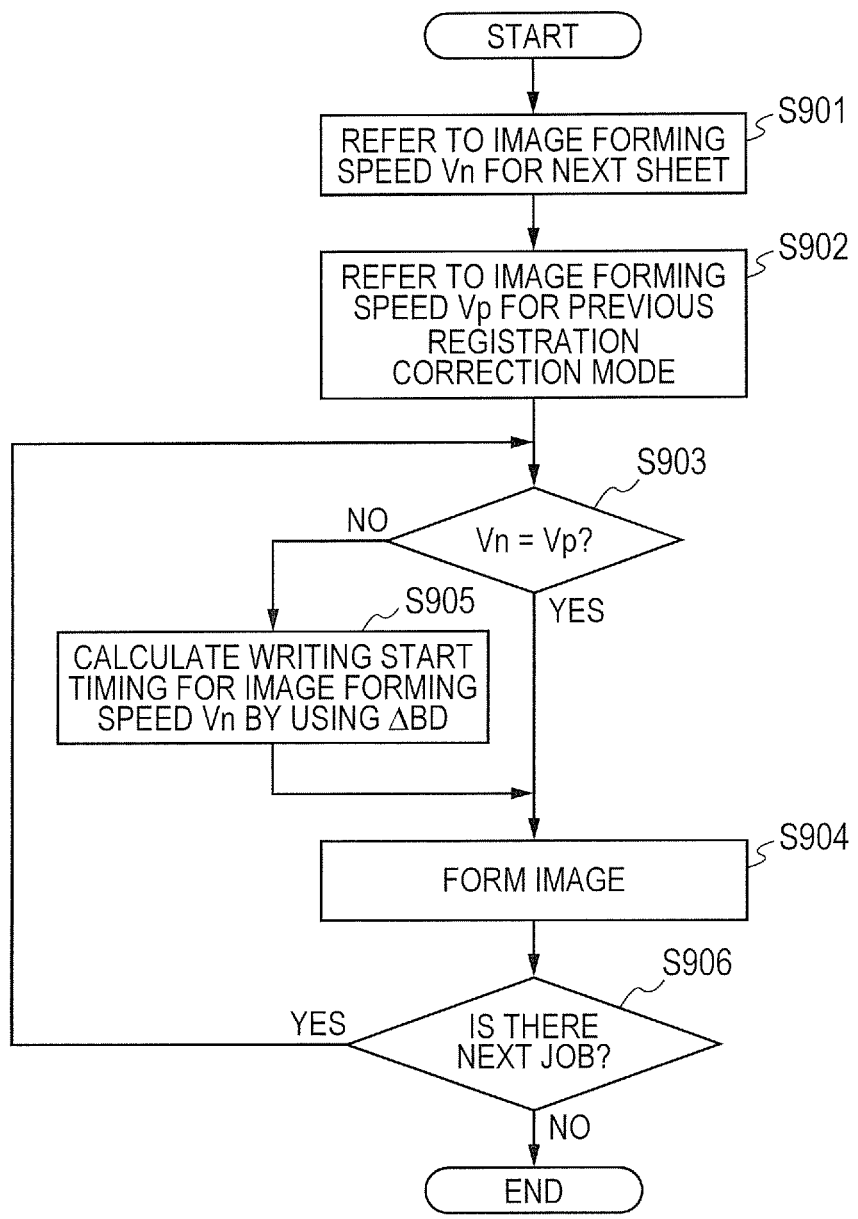
FIG. 23 is a flowchart of an image forming control operation executed by the CPU.

An image forming control operation will be described. A method is described in which the writing start timing BPS used to form an image is corrected in the image forming control operation by adjusting the correction amount ΔBD that is calculated in the main scanning registration image forming speed correction mode described above while taking into account a light intensity that is determined in the image density correction mode. FIG. 23 is a flowchart of the image forming control operation executed by the CPU 141. The CPU 141 executes the image forming control operation as programmed by a program that is stored in the storage portion 140. When the image forming control operation is started, the CPU 141 searches the storage portion 140 to refer to an image forming speed Vn at which an image is formed on the next sheet (Step S901). The storage portion 140 stores an image forming speed that is determined for each sheet based on information input by a user through the operation portion. The CPU 141 functions as a speed switching unit configured to switch the image forming speed of the image forming apparatus 100 between a plurality of image forming speeds so that the image forming speed stored for each sheet in the storage portion 140 is set. The CPU 141 searches the storage portion 140 to refer to an image forming speed Vp that is used in the registration correction mode executed last time (Step S902). The registration correction mode includes the before-image formation registration correction mode and the image-to-image interval registration correction mode.

The CPU 141 determines whether or not the image forming speed Vn of the next sheet matches the image forming speed Vp in the previous registration correction mode (Step S903). When the image forming speed Vn of the next sheet matches the image forming speed Vp in the previous registration correction mode ("YES" in Step S903), the CPU 141 uses the registration correction value that is determined in the previous registration correction mode. The CPU 141 forms an image at the image forming speed Vp (=Vn) with the use of writing start timing BPSp that is determined in the previous registration correction mode (Step S904). When the image forming speed Vn does not match the image forming speed Vp ("NO" in Step S903), the CPU 141 calculates writing start timing BPSn at the image forming speed Vn with the use of a correction amount ΔBDpn calculated in the main scanning registration image forming speed correction mode (Step S905).

When the image forming speed Vp in the previous registration correction mode is the first image forming speed V1 and the image forming speed Vn of the next sheet is the second image forming speed V2, for example, the writing start timing BPS2 in the main scanning direction is calculated in a manner described below. The calculation uses the writing start timing BPS1 that is determined in the registration correction mode executed at the first image forming speed V1, the speed ratio SV1/SV2 of the first scanning speed SV1 to the second scanning speed SV2, and the correction amounts ΔBD12 that are used when images are formed at the second image forming speed V2. Writing start timing BPS2$y$, writing start timing BPS2$m$, writing start timing BPS2$c$, and writing start timing BPS2$k$ of the respective colors in the main scanning directions are expressed as follows.

$$BPS2y = BPS1y \times \frac{SV1}{SV2} + \frac{(\Delta BD12yc + \Delta BD12yk)}{2}$$

$$BPS2m = BPS1m \times \frac{SV1}{SV2} + \frac{(\Delta BD12yc + \Delta BD12yk)}{2} + \Delta BD12ym$$

$$BPS2c = BPS1c \times \frac{SV1}{SV2} + \Delta BD12yc$$

$$BPS2k = BPS1k \times \frac{SV1}{SV2} + \Delta BD12yk$$

Correction amounts ΔBD12$ym$, ΔBD12$yc$, and ΔBD12$yk$ include the difference ΔTd3$k$12 in the delay time of the BD signal that is based on the difference in light intensity as described above.

When the image forming speed Vp in the previous registration correction mode is the second image forming speed V2 and the image forming speed Vn of the next sheet is the first image forming speed V1, on the other hand, the writing start timing BPS1 in the main scanning direction is calculated in a manner described below. The calculation uses the writing start timing BPS2 that is determined in the registration correction mode executed at the second image forming speed V2, the speed ratio SV2/SV1, which is the ratio of the second scanning speed SV2 to the first scanning speed SV1, and the correction amounts ΔBD21, which are used when images are formed at the first image forming speed V1. Writing start timing BPS1$y$, writing start timing BPS1$m$, writing start timing BPS1$c$, and writing start timing BPS1$k$ of the respective colors in the main scanning directions are expressed as follows.

$$BPS1y = BPS2y \times \frac{SV2}{SV1} + \frac{(\Delta BD21yc + \Delta BD21yk)}{2}$$

$$BPS1m = BPS2m \times \frac{SV2}{SV1} + \frac{(\Delta BD21yc + \Delta BD21yk)}{2} + \Delta BD21ym$$

$$BPS1c = BPS2c \times \frac{SV2}{SV1} + \Delta BD21yc$$

$$BPS1k = BPS2k \times \frac{SV2}{SV1} + \Delta BD21yk$$

Correction amounts ΔBD21$ym$, ΔBD21$yc$, and ΔBD21$yk$ include the difference ΔTd3$k$21 in the delay time of the BD signal that is based on the difference in light intensity as described above.

The CPU 141 uses the calculated writing start timing BPSn to form images at the image forming speed Vn (Step S904). With the writing start timing BDSn corrected by the correction amounts ΔBDpn, the color misregistration amount is reduced. The CPU 141 determines whether or not there is an image forming job to be executed next (Step S906). When there is an image forming job to be executed next ("YES" in Step S906), the processing returns to Step S903, where the image forming operation is continued. When there is no image forming job to be executed next ("NO" in Step S906), the CPU 141 ends the image forming control operation.

According to the second embodiment, the correction amount ΔBDpn, which includes the amount of color misregistration caused by a change in the intensity of a light beam, and the writing start timing BPSp determined in the previous registration correction mode are used to calculate the writing start timing BPSn for the next sheet, and an image is formed at the calculated timing. Color misregistration can therefore be reduced by correcting the writing start timing by the method of the second embodiment, even when the writing start timing is changed due to a change in the light intensity of a light beam. According to the second embodiment, image misregistration caused by switching the image forming speed can be prevented irrespective of a change in light intensity, while shortening the length of time in which image forming is stopped (downtime).

In the opposed-scanning-type light scanning device 200, the yellow light beam 221Y and the magenta light beam 221M are scanned in a direction reverse to the scanning direction of the black light beam 221K and the cyan light beam 221C with respect to the recording medium. When color misregistration due to the delay time Td occurs, the color misregistration is therefore in directions reverse to each other, and is thus noticeable. Opposed-scanning-type light scanning device of the related art deal with this by executing a registration correction mode each time the image forming speed is switched to a different speed, which lowers the productivity. According to the second embodiment, on the other hand, the writing start timing BPSn of the next sheet can be determined based on the correction amount ΔBDpn, without executing registration correction, and thus color misregistration can be corrected effectively particularly when the light scanning device 200 is of the opposed-scanning-type.

Figure 24:
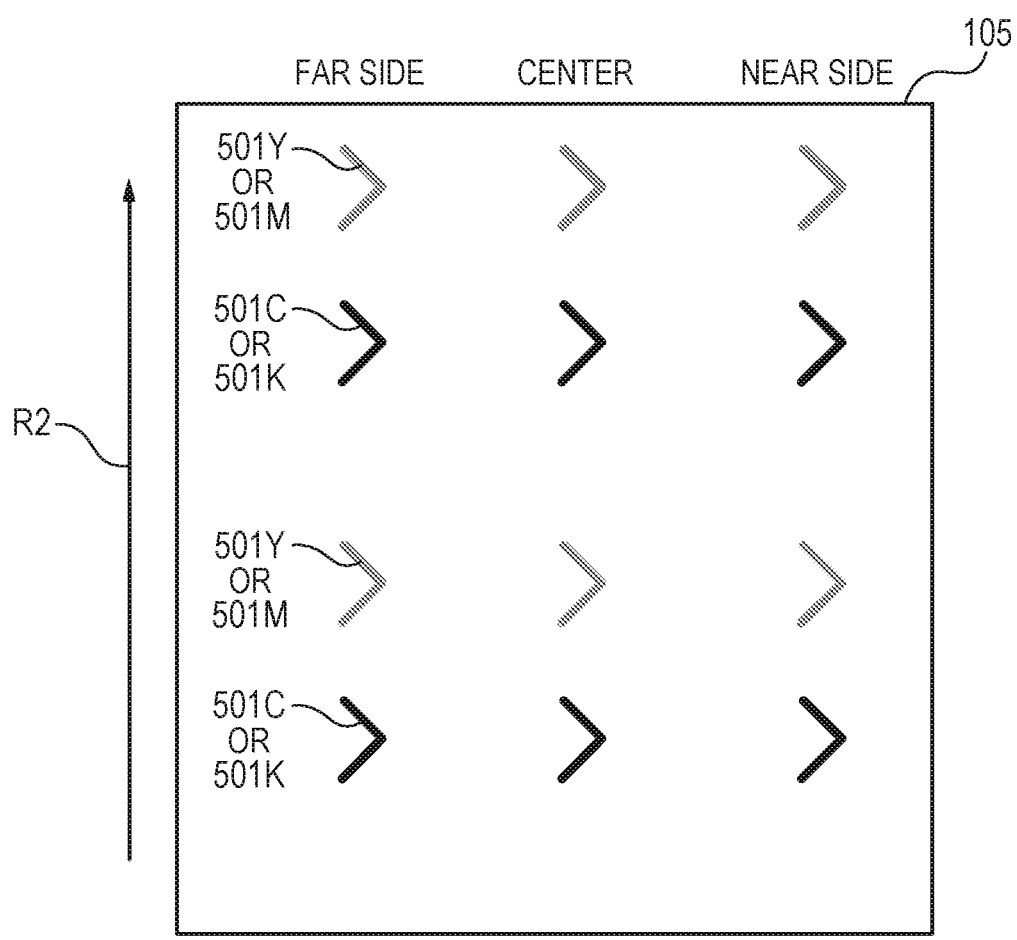
FIG. 24 is a diagram for illustrating registration correction patterns for only two colors.

In the case of the opposed-scanning-type light scanning device 200 of the second embodiment, the yellow light beam 221Y and the magenta light beam 221M are opposed to the black light beam 221K and the cyan light beam 221C as illustrated in FIG. 2A. When the yellow light beam 221Y is used as a reference, the correction amount ΔBDym is substantially 0 (zero) in the main scanning registration image forming speed correction mode. The correction amount ΔBDyc and the correction amount ΔBDyk are substantially the same. It is therefore sufficient if the correction amount ΔBDyc or ΔBDyk can be calculated. In the case where the magenta light beam 221M is used as a reference, it is sufficient if the correction amount ΔBDmc or ΔBDmk can be calculated. The registration correction patterns used in the main scanning registration image forming speed correction mode may therefore be reduced to patterns for two colors. FIG. 24 is a diagram for illustrating the registration correction patterns 501 that include only patterns for two colors, namely, 501Y or 501M and 501C or 501K. As illustrated in FIG. 24, the yellow registration correction pattern 501Y or the magenta registration correction pattern 501M and the cyan registration correction pattern 501C or the black registration correction pattern 501K are formed. The same correction as the one described above is accomplished by calculating one of ΔBDyc, ΔBDyk, ΔBDmc and ΔBDmk from the registration correction patterns for two colors.

The same applies to an image forming apparatus that uses opposed-scanning-type light scanning device in which the yellow light beam 221Y and the cyan light beam 221C are opposed to the magenta light beam 221M and the black light beam 221K. The yellow registration correction pattern 501Y or the cyan registration correction pattern 501C and the magenta registration correction pattern 501M or the black registration correction pattern 501K are formed. The same correction as the one described above is accomplished by calculating one of ΔBDym, ΔBDyk, ΔBDcm and ΔBDck from the registration correction patterns for two colors.

While the second embodiment uses light sources that emit a plurality of light beams, the present invention is applicable also to an image forming apparatus having a light source that emits a single light beam. In this case, the position of an image with respect to the sheet S can be corrected instead of color misregistration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-096778, filed May 13, 2016, and Japanese Patent Application No. 2016-102264, filed May 23, 2016, which are hereby incorporated by reference herein in their entirety.

What is claimed is:

1. An image forming apparatus, which is operable at a plurality of image forming speeds, comprising:
   a photosensitive member;
   a light source configured to emit a light beam;
   a deflection unit configured to deflect the light beam emitted from the light source so that the light beam scans on a surface of the photosensitive member in a main scanning direction;
   a developing unit configured to develop, with a toner, an electrostatic latent image, which is formed on the surface of the photosensitive member by the light beam, into a toner image;
   a transfer unit configured to transfer the toner image from the surface of the photosensitive member onto a bearing member or a recording medium that is conveyed by the bearing member;
   a pattern detection unit configured to detect a registration correction pattern, which is transferred onto the bearing member by the transfer unit; and
   a processor and a memory configured to function as:
      a writing start timing determination unit configured to determine writing start timing at which the electrostatic latent image is started to be written on the photosensitive member by the light beam emitted from the light source, based on a detection result of the pattern detection unit;
      a storage unit configured to store a correction amount for correcting the writing start timing that is determined by the writing start timing determination unit;
      a density detection unit configured to detect a density correction pattern, which is transferred onto the bearing member by the transfer unit; and
      a light intensity setting unit configured to set a light intensity of the light beam that is emitted from the light source, based on a detection result of the density detection unit,
   wherein, in a case where a previous image forming speed when the registration correction pattern is detected by the pattern detection unit is the same as a next image forming speed at which a next image is formed, the next image is formed at the writing start timing that is determined by the writing start timing determination unit at the previous image forming speed, and
   wherein, in a case where the previous image forming speed differs from the next image forming speed, the correction amount is corrected based on a difference between a light intensity of the light beam when the registration correction pattern is formed and a light intensity of the light beam when the next image is formed, the writing start timing that is determined by the writing start timing determination unit at the previous image forming speed is corrected based on a corrected correction amount and on a speed ratio of the previous image forming speed to the next image forming speed, and the next image is formed based on a corrected writing start timing.

2. An image forming apparatus according to claim 1, further comprising a beam detector configured to receive the light beam to generate a synchronization signal for keeping a writing start position of the electrostatic latent image at a constant position in the main scanning direction on the surface of the photosensitive member, wherein the correction amount is corrected based on a relation between the light intensity of the light beam that enters the beam detector and output timing of the synchronization signal, and on the difference in the light intensity of the light beam that enters the beam detector.

3. An image forming apparatus according to claim 1, wherein the processor and memory are further configured to function as a misregistration amount detection unit configured to detect a misregistration amount of the registration correction pattern in the main scanning direction, based on the detection result of the pattern detection unit, wherein the correction amount is calculated from the misregistration amount detected by the misregistration amount detection unit.

4. An image forming apparatus according to claim 1, wherein the photosensitive member comprises a first photosensitive member and a second photosensitive member, wherein the light source emits a first light beam and a second light beam, and wherein a first main scanning direction in which the first light beam emitted from the light source scans on the first photosensitive member is reverse to a second main scanning direction in which the second light beam emitted from the light source scans on the second photosensitive member.

5. An image forming apparatus according to claim 4, wherein the correction amount is calculated from a misregistration amount in the main scanning direction between a first registration correction pattern and a second registration correction pattern, the first registration correction pattern being formed by developing, with a toner, an electrostatic latent image that is formed on the first photosensitive member by the first light beam and transferring a developed image onto the bearing member by the transfer unit, the second registration correction pattern being formed by developing, with a toner, an electrostatic latent image that is formed on the second photosensitive member by the second light beam and transferring a developed image onto the bearing member by the transfer unit.

6. An image forming apparatus according to claim 5, wherein the correction amount is calculated from a value that is a half of the misregistration amount in the main scanning direction.

7. An image forming apparatus according to claim 5, wherein the plurality of image forming speeds comprise a first image forming speed and a second image forming speed, which differs from the first image forming speed, and wherein the correction amount is calculated from a first misregistration amount and a second misregistration amount, the first misregistration amount being an amount of misregistration in the main scanning direction between the first registration correction pattern and the second registration correction pattern that are transferred onto the bearing member at the first image forming speed, the second misregistration amount being an amount of misregistration in the main scanning direction between the first registration correction pattern and the second registration correction pattern that are transferred onto the bearing member at the second image forming speed.

8. An image forming apparatus according to claim 7, wherein the second image forming speed is lower than the first image forming speed, and wherein the pattern detection unit detects, when the image forming apparatus forms a plurality of images at the second image forming speed, the first registration correction pattern and the second registration correction pattern that are transferred onto the bearing member between one toner image and another toner image that are transferred onto the bearing member, or between one recording medium and another recording medium that are conveyed by the bearing member.

9. An image forming apparatus according to claim 7, wherein the pattern detection unit detects the first registration correction pattern and the second registration correction pattern that are transferred onto the bearing member at the first image forming speed before the image forming apparatus forms an image.

10. An image forming apparatus according to claim 8, wherein the density detection unit detects, when the image forming apparatus forms a plurality of images at the second image forming speed, the density correction pattern that is transferred onto the bearing member between one toner image and another toner image that are transferred onto the bearing member, or between one recording medium and another recording medium that are conveyed by the bearing member.

11. An image forming apparatus according to claim 1, wherein, in a case where the previous image forming speed differs from the next image forming speed and where the light intensity of the light beam when the next image is formed is the same as the light intensity of the light beam when the registration correction pattern is formed, the writing start timing that is determined by the writing start timing determination unit at the previous image forming speed is corrected based on the correction amount that is stored in the storage unit without correcting the correction amount, and the next image is formed based on a corrected writing start timing.

\* \* \* \* \*